United States Patent [19]

Abe et al.

[11] Patent Number: 4,611,380

[45] Date of Patent: Sep. 16, 1986

[54] ASSEMBLY LINE MANUFACTURING CONTROL APPARATUS

[75] Inventors: Kazuyoshi Abe; Masahiko Kawasaki; Kazuhiko Yazaki; Yoshitada Sekine, all of Tokyo, Japan

[73] Assignee: Nissan Motor Company, Limited, Yokohama, Japan

[21] Appl. No.: 564,927

[22] Filed: Dec. 23, 1983

[30] Foreign Application Priority Data

Dec. 28, 1982 [JP] Japan ................... 57-232978

[51] Int. Cl.⁴ ............................................. B21D 39/03
[52] U.S. Cl. ........................................ 29/430; 29/458
[58] Field of Search ................. 29/429, 430, 458, 701, 29/711

[56] References Cited

U.S. PATENT DOCUMENTS 3,525,867  8/1970  Konrad ........................... 250/209
4,332,012  5/1982  Sekine et al. .................... 364/468

FOREIGN PATENT DOCUMENTS 1531007  6/1971  Fed. Rep. of Germany.
2702544  7/1978  Fed. Rep. of Germany.

OTHER PUBLICATIONS

European Search Report.

Primary Examiner—Howard N. Goldberg
Assistant Examiner—Timothy V. Eley
Attorney, Agent, or Firm—Schwartz, Jeffery, Schwaab, Mack, Blumenthal & Evans

[57] ABSTRACT

A bar-code control for a manufacturing process employs a bar-code label with a combination of narrow and wide slots constituting a bar code in combination. The bar-code label is attached to a base component to which various other components are to be assembled in an assembly process and a painting process. In the assembly process, information and instructions represented by the bar code are optically read to identify the components to be assembled to the base component and to control the assembly operations. In the painting process, the bar code is read to identify the required color to be painted and to control the painting operation.

45 Claims, 29 Drawing Figures

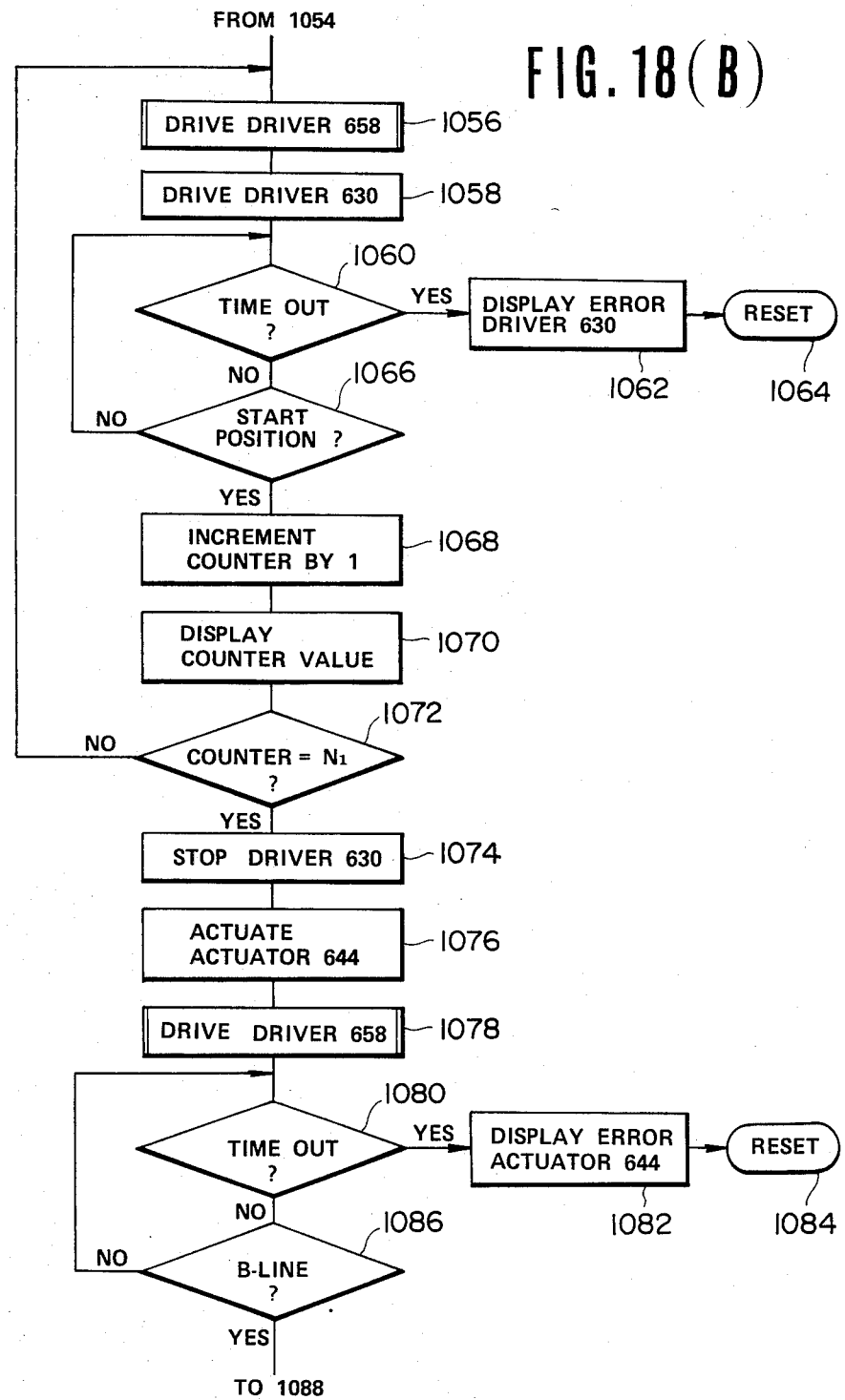

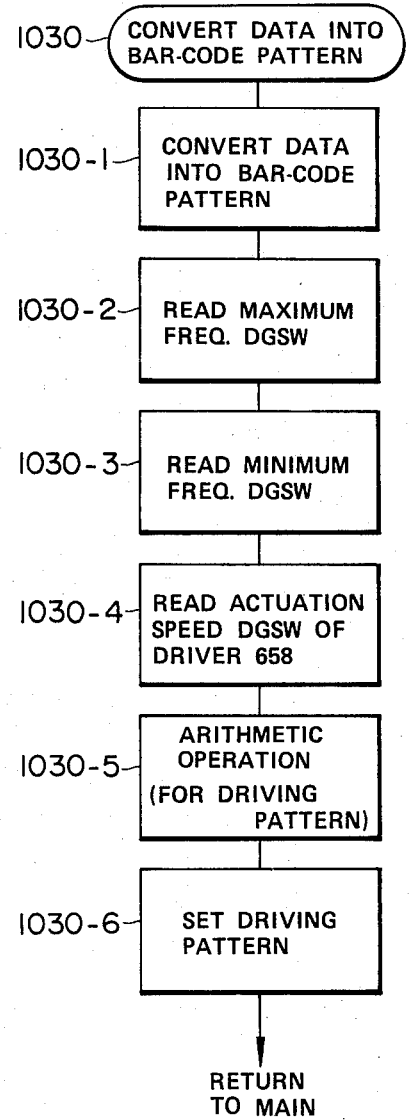
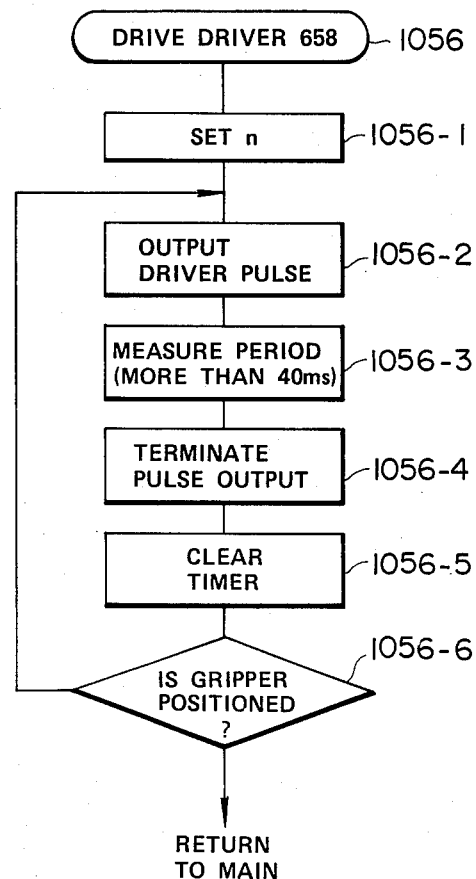

4,611,380

ASSEMBLY LINE MANUFACTURING CONTROL APPARATUS

BACKGROUND OF THE INVENTION

The present invention relates generally to control of an industrial manufacturing process for manufacturing various models, types and/or specifications of products by means of a single manufacturing line. More particularly, the invention relates to control of manufacturing processes including a step of painting by means of a bar-code label with a plurality of narrower and wider slots the combination of which represents specific binary data, which binary data is representative of the specific model, type and/or specification of the individual product to be produced.

In the automotive industry, various models, types and/or specifications of automotive vehicles are manufactured on a common manufacturing line. The various models, types and/or specifications of the vehicles are transferred through the manufacturing line in order according to a production plan. The manufacturing line consists of various stations for performing different manufacturing operations according to information and instructions corresponding to each of the individual vehicles to be produced. Various vehicle components to be assembled into the corresponding model, type and/or specifications of vehicles are stored at each station. Selection of the corresponding components and assembly of the selected components are performed at each station according to the information and instructions given for each individual vehicle.

For controlling such automotive industry manufacturing operations, a bar-code control system has been developed and proposed. For example, U.S. Pat. No. 4,332,012 to Sekine et al, which has been assigned to the assignee to the present invention, discloses a control system for an automotive vehicle component assembly line employing a bar-code label containing information and instructions relating to model, type and specifications of the vehicle components to be assembled. The disclosure thereof is particularly directed to a sequence of assembly lines for assembling automotive vehicle bodies, which includes a pre-assembly station, a floor assembly line, a body assembly line, a body finishing line and so forth. A bar-code label is formed from a magnetic rubber label on which a bar code is printed. The bar-code label is attached mechanically or magnetically to a sub- or pre-assembly to be applied to the assembly line. This bar-code label must be removed before the assembled vehicle body is fed to a painting process.

In the vehicle body assembly process, the painting process requires various treatment steps for painting the vehicle body which may vary according to differences between the models, types and/or specifications of the vehicle bodies. For example, the vehicle bodies fed to the painting shop may not necessarily require painting in the same color but rather will probably require different colors according to their specifications. Furthermore, special treatment is required when the vehicle body to be painted two-tone. Similar to the vehicle body assembling operation, identification of the body colors of the individual vehicle body and recognition of the required painting treatment for each sequentially fed vehicle body is a very troublesome job. Especially since the painting station consists of a plurality of sub-stations performing only one or two painting steps, it is wasteful to identify which treatments are required at each sub-station.

SUMMARY OF THE INVENTION

Therefore, it is an object of the present invention to provide a control system for controlling a manufacturing process by means of a bar-code label which is effectively applicable to a process to which the conventional printed bar-code label cannot be applied.

Another and more specific object of the present invention is to provide a bar-code control system including a bar-code label including narrower and wider through slots arranged so as to represent specific binary data which is in turn indicative of the information required to produce a product.

A further object of the invention is to provide a bar-code control system applicable to the automotive industry, especially for an automotive vehicle body assembly process including a painting process.

To achieve the foregoing and other objects, a bar-code control system for a manufacturing process includes a bar-code label having a combination of narrower and wider slots formed in an essentially rigid label sheet. The narrower and wider slots are arranged so that the combination thereof is representative of specific binary data indicative of the components to be assembled into a specific product to be manufactured and of the required process steps. The bar-code labels are prepared according to the production plan and the encoded information is based on the models, types and/or specifications of the products to be manufactured. The bar-code labels sequentially or continuously prepared are attached to the corresponding base components of the products. The slotted bar code is read by means of an optical bar-code reader or a laser scanner at each station. The bar code is read and converted into a digital code identifying components to be assembled to the base component and the processes required.

In the case of an automotive vehicle body assembly process including a painting process, the bar-code label remains on the assembled vehicle body when the latter enters the painting shop. In the painting shop, necessary information and instructions are obtained by reading the bar code and converting the read bar code into a digital code identifying body color, required process steps and so forth.

According to the present invention, a control system for controlling a manufacturing process in which varius models, types and/or specifications of products are put into a common line, comprises first means for obtaining information and instructions related to each of the products to be manufactured according to a predetermined production plan and for generating an electrical signal representative of the obtained information and instructions of the products at a given timing, second means, responsive to the electrical signal from the first means, for converting the electrical signal into a bar-code pattern and encoding the determined bar-code pattern in a label, the bar-code consisting of a combination of identical first slots and identical second slots, the second slots being of different size from the first slots, and the first and second slots being arranged to represent the contents of the electrical signal, third means for attaching the encoded label to a base component to which other components are to be assembled, and fourth means for reading the bar-code in the label and obtaining information identifying components to be assembled to the base component and instructions controlling manufacturing process operations, the fourth means producing a control signal based on the specific binary code read from the label, which control signal is indicative of the identified components and required manufacturing process operations.

According to the present invention, a method for controlling a manufacturing process having a plurality of stations constituting a common line through which various types, models and/or specifications of products are produced is provided. The control method according to the present invention is particularly adapted to be applied to a manufacturing line having a painting station. A bar-code label used in the control method is effective even in the painting station to provide information and instructions relating to the models, types and/or specifications of the products. The bar-code label has a plurality of narrower and wider slots which specify a specific digital code representing the model, type and/or specifications of the product and remains legible even after several painting steps are performed.

In one aspect of the invention, the method comprises the steps of converting digital signals, each of which is indicative of information and instructions for the manufacturing process corresponding to the specific model, type and specifications of a specific product, into a bar-code pattern, forming a combination of identical first slots and identical second slots in a bar-code label, the first and second slots being of different size and arranged to form a bar code corresponding to the bar-code pattern, reading the bar-code in the bar-code label and converting the bar-code into a digital code representative of the information and instructions used in the assembly of each product, and reading the bar-code and in the bar-code label and converting the bar-code into a digital code representative of the information and instructions for controlling the painting process.

BRIEF DESCRIPTION OF THE DRAWINGS

The present invention will be described in more detail with reference to the preferred embodiment of the present invention, which however, should not be taken to limit the invention thereto but for explanation and understanding only.

In the drawings:

FIGS. 18(A) to 18(E) are a flowchart of a sequence of control program to be executed by a controller in the control system of FIG. 17 to control the operation of the foregoing bar-code encoding device;

FIGS. 19, 20, and 22, are flowcharts of programs as sub-routines of the control program of FIGS. 18(A) to 18(E)

DESCRIPTION OF THE PREFERRED EMBODIMENT

The preferred embodiment of a bar-code label and production therefor will be described herebelow in terms of application to automotive vehicle body assembly including a painting process for the assembled vehicle body.

Although the preferred embodiment of the bar-code label will be shown in terms of application to automotive vehicle body assembly, it should be appreciated that the bar-code label according to the present invention is applicable not only to automotive vehicle manufacture but also other manufacturing processes which may include painting processes and so forth to which printed bar codes of the prior art could not be applied. Particularly, the bar-code label control employing the bar-code of the present invention would be useful in manufacturing various types, models and specifications of products or components assembled on a single common line and painted in a subsequent painting line.

Figure 1:
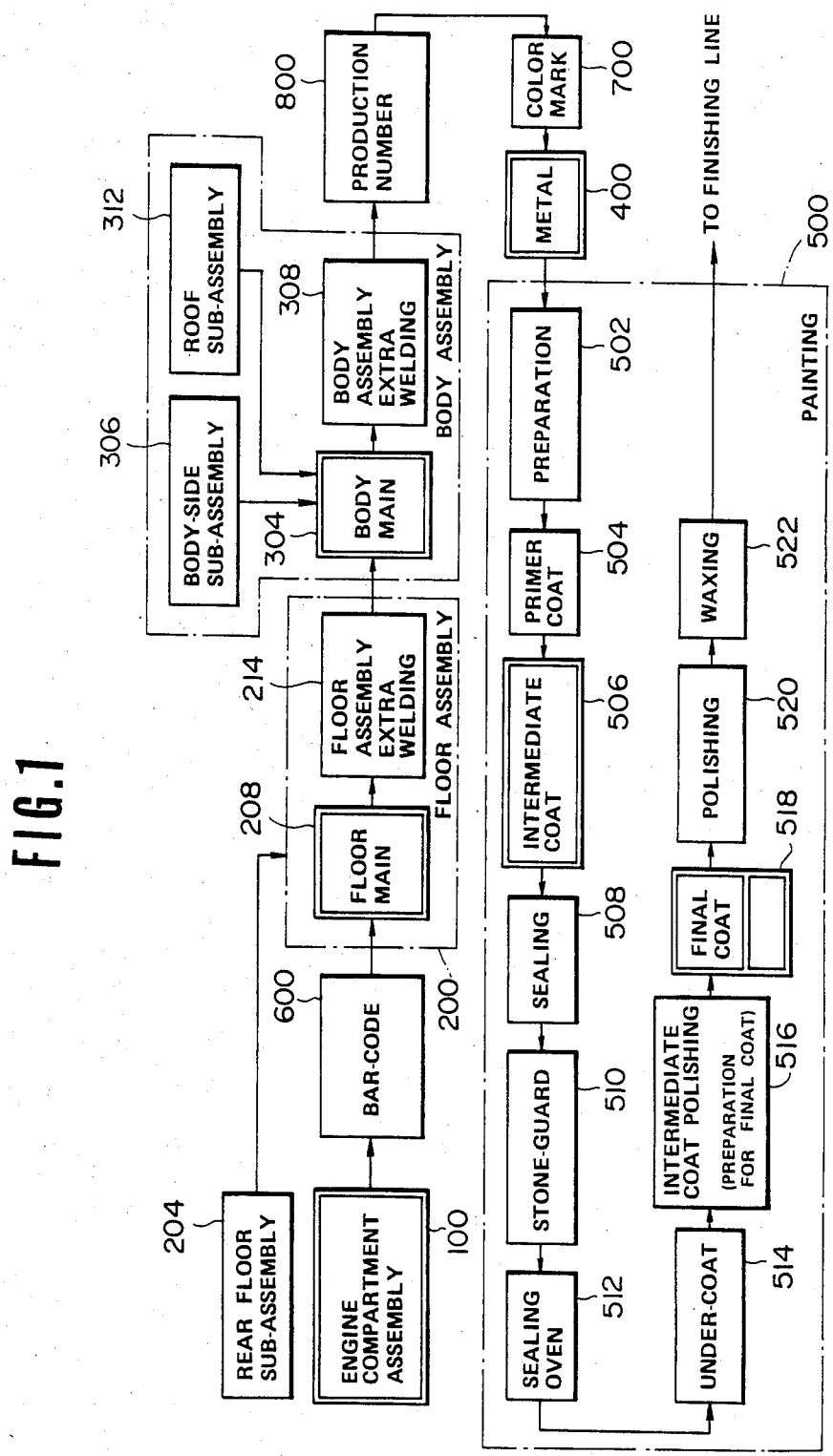
FIG. 1 is a schematic block diagram showing an automotive vehicle body manufacturing process including a painting, to which the preferred embodiment of a bar-code label according to the present invention is applied.

FIG. 1 shows an automotive vehicle body manufacturing or assembly process including painting process. An automotive vehicle body assembly line includes a line 100 for assembling an engine compartment assembly 102, which line will be referred to hereafter as "engine compartment assembly line", a line 200 for assembling a vehicle floor assembly 202 to the engine compartment assembly 102, which line 200 will be referred to hereafter as "floor assembly line", a line 300 for assembling a body assembly 302 to the floor assembly 202, which line 300 will be referred to hereafter as "body assembly line", a line 400 for completing a vehicle body by mounting doors, fenders and so forth, which line 400 will be referred to hereafter as "metal line", and a line 500 for painting the assembled vehicle body, which line 500 will be referred to hereafter as "painting line". As apparent from FIG. 1, the floor assembly line 200 is associated with a sub-assembly station 204 for preparing a rear floor assembly 206 as a sub-assembly. The rear floor assemblies 206 prepared in the rear floor sub-assembly station 204 is sorted in a storage area (not shown) and picked up and supplied to a floor main station 208 for assembling the rear floor assembly 206 and a front floor 210 and side members 212 to the engine compartment assembly 102 from the engine compartment assembly line 100. An extra welding station 214 following the floor main station 208 performs additional welding operations on the floor assembly 202.

The body assembly line 300 includes a body main station 304, a body side sub-assembly station 306 associated with the body main station 304, and an extra welding station 308. The body side sub-assembly station 306 prepares body side sub-assemblies 310. The body side subassemblies 310 prepared at the body side sub-assembly station 306 are sorted into a storage area (not shown). Likewise, roof sub-assembly station 312 is associated with the body main station 304 for preparing roof panel sub-assemblies 314.

The painting line 500 includes a preparation station 502 at which washing, surfacing and so forth are performed, an electro-deposition primer coat station 504, an intermediate coat station 506, a sealing station 508, a stone-guard station 510, a sealing oven 512, an undercoat station 514, a intermediate coat polishing station 516, a final coat station 518, a polishing station 520 and a wax booth 522.

Figure 13:
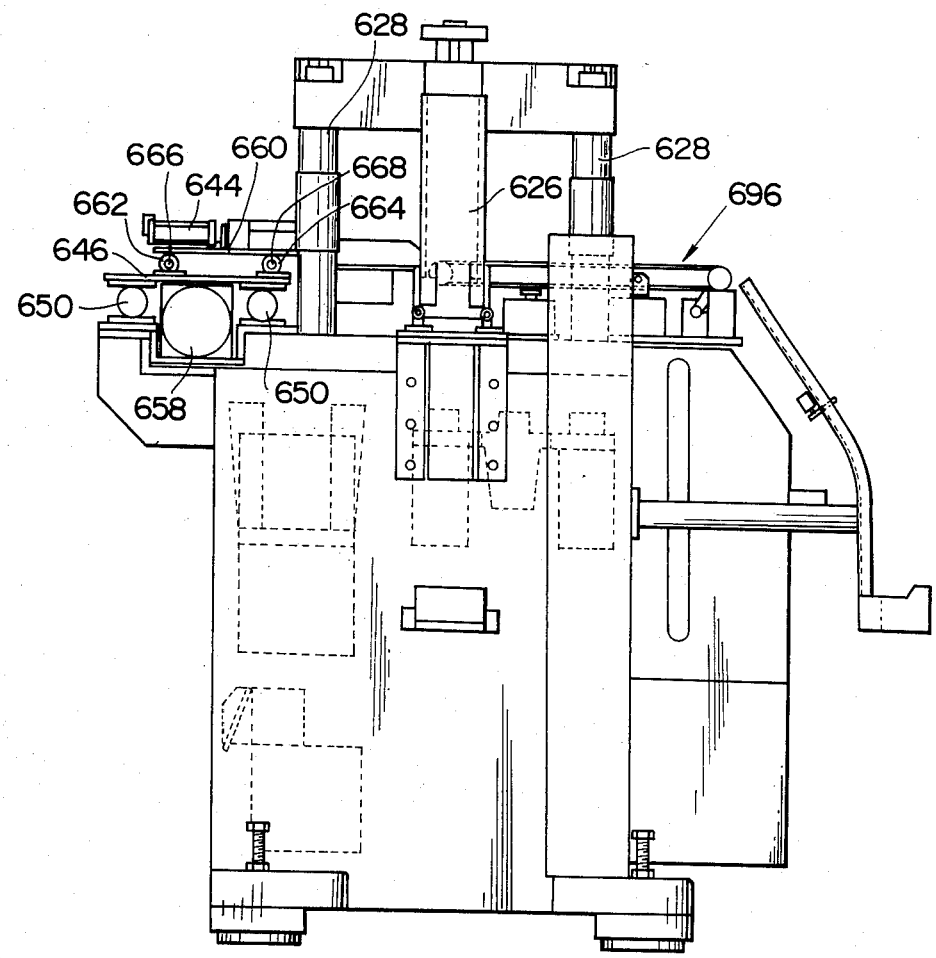
FIG. 13 is a right side elevation of the preferred embodiment of bar-code encoding device of FIG. 12.

The engine compartment assembly line 100, the floor assembly line 200, the body assembly line 300, the metal line 400 and the painting line 500 are connected serially in the given order by a per se well-known transportation system, such as a transporting conveyor, a transporting lift and so forth. Between the engine compartment line 100 and the floor assembly line 200, a station 600 is provided for preparing a bar-code label 602 which will be described in detail later, and for attaching the prepared bar-code label to the engine compartment assembly 102. In the preferred embodiment, the bar-code label 602 hangs from a front wheel house 104 of the engine compartment assembly 102. Between the body assembly line 300 and the metal line 400 lies a station 700 for applying a body production number to an appropriate point on the body assembly 302. The manner of application of the body production number and device therefor has been disclosed in the U.S. Pat. No. 4,332,012, especially in FIGS. 13 to 15 thereof. The disclosure of the U.S. Pat. No. 4,332,012 is hereby incorporated by reference for the purpose of the disclosure. Between the body assembly line 300 and the metal line 400 lies another station 800 for applying color marks to the body assembly 302 for identifying which components are to be assembled to the body assembly in the metal line.

The components assembled in each of the engine compartment assembly line 100, the floor assembly line 200, the body assembly line 300 and the metal line 400 will be briefly described below with reference to FIGS. 2 to 5.

Figure 2:
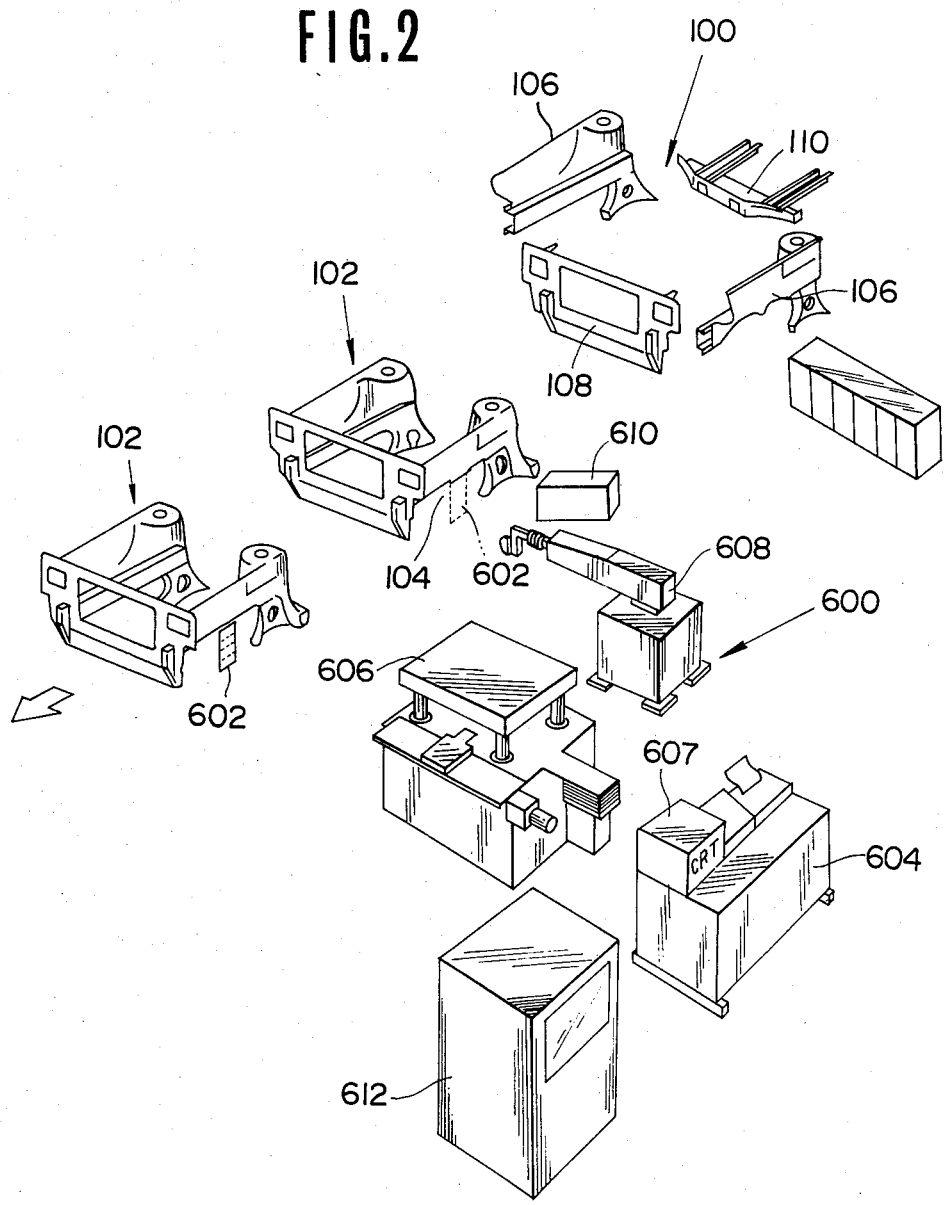
FIG. 2 is a fragmentary illustration of an engine compartment line in the vehicle body manufacturing, to which the preferred embodiment of a bar-code encoding device according to the present invention is associated.

As shown in FIG. 2, the engine compartment assembly line 100 assembles the engine compartment assembly 102 with hood ridges 106, a radiator core support 108 and a cross-member 110. The hood ridge 106 defines the front wheel house 104. The bar-code station 600 is located downstream of the engine compartment assembly line 100. The bar-code station generally comprises a controller 604 including a CRT display 607, a punch press 606 for preparing the bar-code label 602, a robot 608 for attaching the prepared bar-code label 602 to the engine compartment assembly 102, and a bar-code reader 610 for reading data from the bar-code label 602 and feeding back the read data to the controller for confirmation. The controller 604 is connected to a master controller 612 which holds data relating to models, types and specifications of the vehicle bodies to be assembled. According to the production plan, the data about the vehicles is transferred to the controller 604. According to the data input from the master controller, the controller 604 controls the operation of the punch press 606 serving as a bar-code encoding device for preparing the bar-code label 602 containing the data corresponding to that supplied by the master controller.

Figure 7:
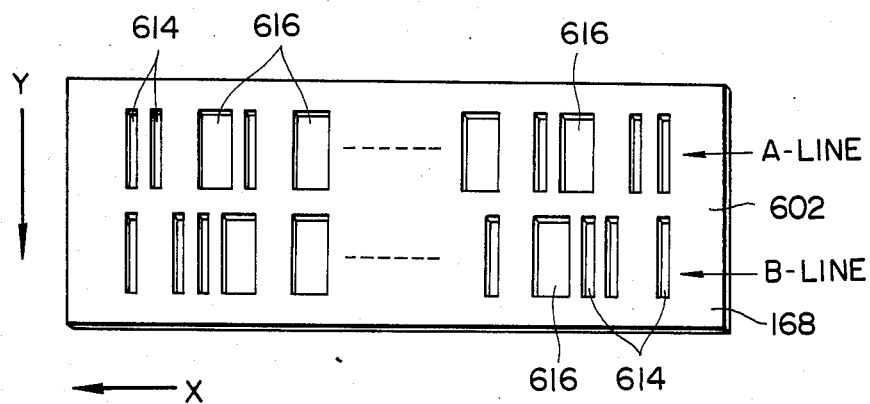
FIG. 7 is a perspective illustration of the preferred embodiment of the bar-code label according to the present invention.
Figure 8:
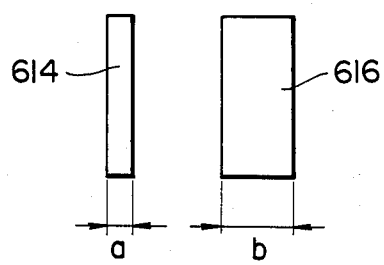
FIG. 8 is an illustration showing wider and narrower slots to be formed in the bar-coded label.

The bar-code formed in the bar-code label 602 consists of a combination of narrower slots 614 and wider slots 616, as shown in FIG. 7. As shown in FIG. 8, the narrower slot 614 has a width a and the wider slot 616 has a width b. In general, the narrower slot 614 is representative of digital value "0" and the wider slot 616 is representative of digital value "1". The overall bar code on the bar-code label 602 is representative of a digital value indicative of and corresponding to the data from the master controller.

The principle point of and the essential feature of the invention is to facilitate use of the bar-code label 602 of FIG. 7, in which the slots 614 and 616 are formed with rectangular openings with the foregoing specific width.

In the shown application of the bar-code control system for the vehicle body assembling, the bar-code label 602 includes two sequences of aligned slots, each sequence having sixteen slots representing sixteen binary digits.

The bar-code reader 610 comprises a laser-scanner, for example, for optically reading the content of bar-code on the bar-code label 602. The same or similar bar-code readers may be provided at each assembly line or station to read the bar code and obtain data relating to the components which must be assembled and the required assembly operations associated therewith.

As set forth above, the engine compartment assembly 102 with the bar-code label 602 is transferred to the floor assembly line 200. In the floor assembly line 200, the front floor 210 and the rear floor assembly 206 are assembled to the engine compartment assembly 102 to form the floor assembly 202. The floor assembly 202 is transferred to the body assembly line 300 so that the body side members 310 and the roof panel 314 may be added to form the body assembly. In the metal line 400, side doors 404, front fenders 406 and back doors 408 are attached to the body assembly to complete the vehicle body assembly. In the shown example, the vehicle body being assembled is a two-door, hatch-back-type vehicle. Although a specific type of vehicle body assembly and corresponding components are described here, the vehicle body assembly line will assemble not only the shown type of vehicle but also other types of vehicles, such as sedans, coupes and so forth.

Figure 3:
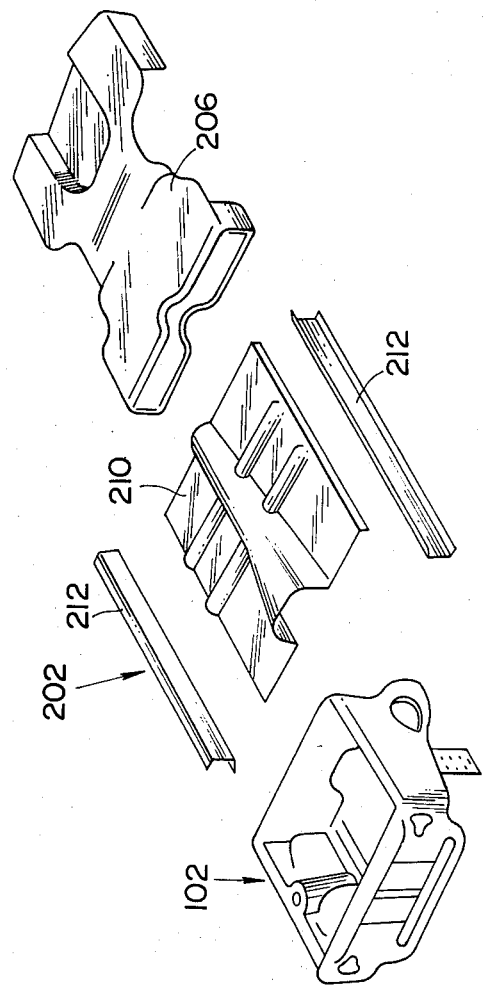
FIG. 3 is a fragmentary illustration of a floor assembly line in the vehicle body manufacturing of FIG. 1.
Figure 4:
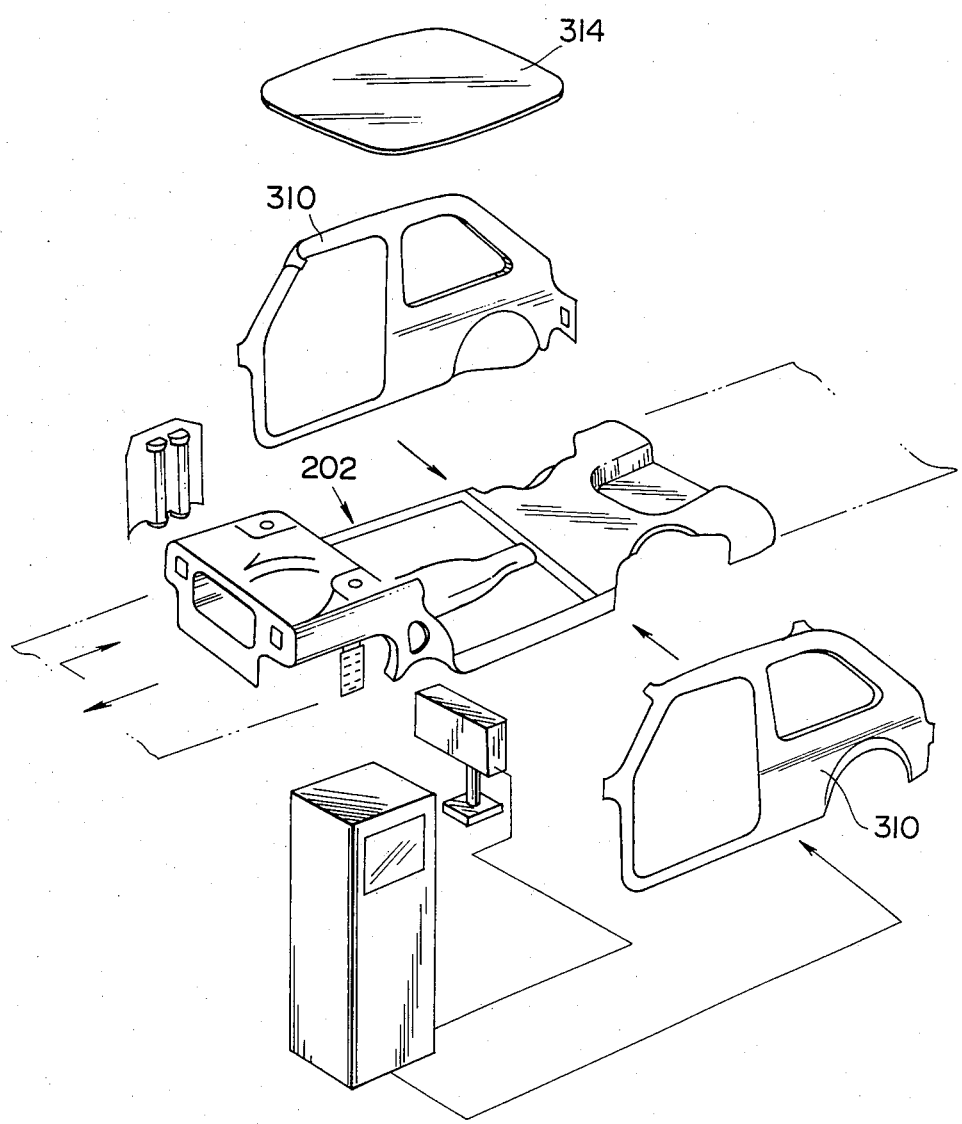
FIG. 4 is a fragmentary illustration of a body assembly line in the vehicle body manufacturing of FIG. 1.
Figure 5:
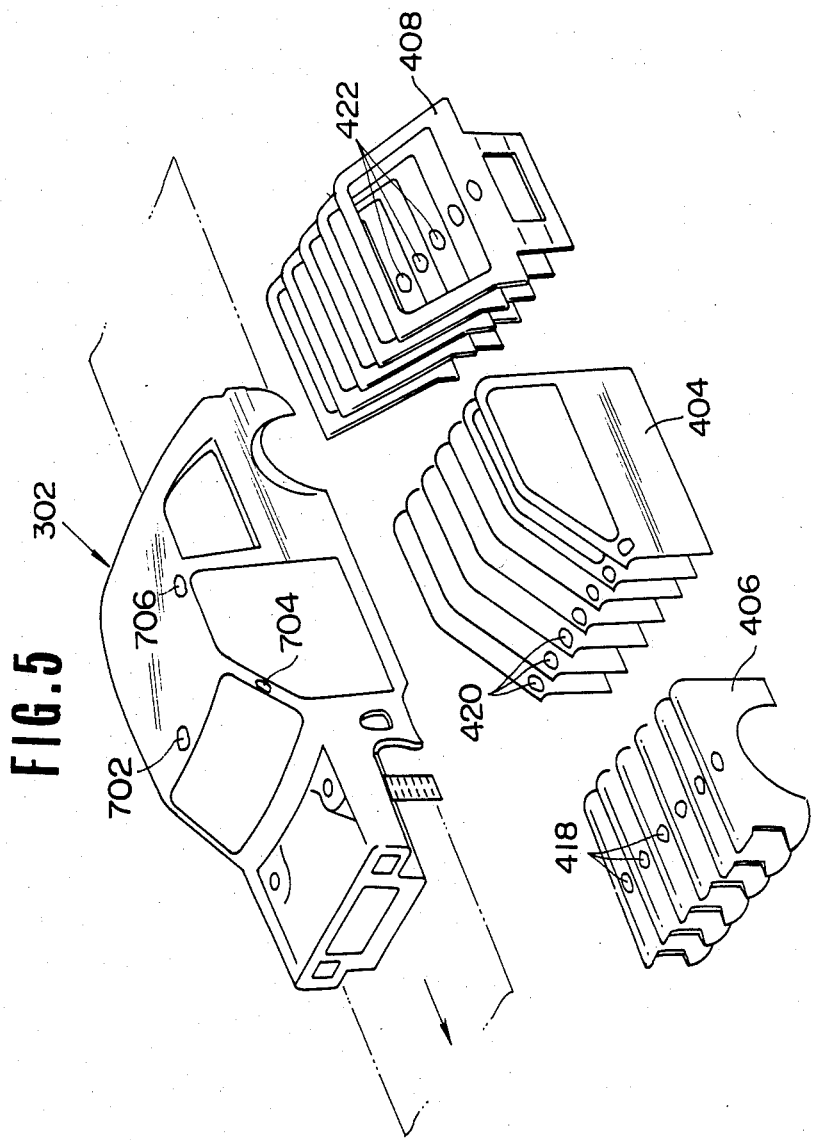
FIG. 5 is a fragmentary illustration of a metal line in the vehicle body manufacturing of FIG. 1.

As seen in FIGS. 3 to 5, each assembly line has a bar-code reader and controller controlling selection of components to be assembled and other line operations. Each controller may be a digital processor for processing the read digital data and controlling selection of the components and assembling operations.

Figure 6:
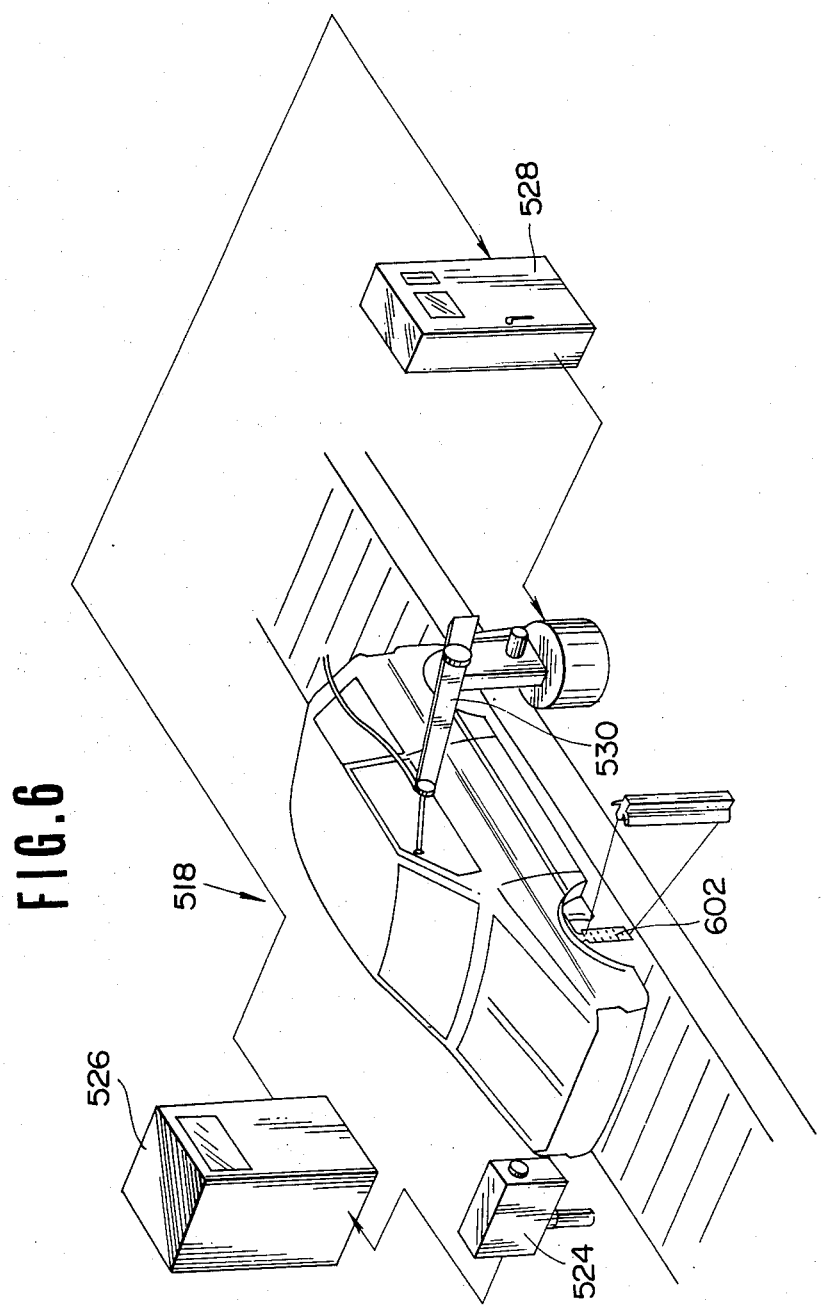
FIG. 6 is a fragmentary illustration of a finishing station in a painting line of FIG. 1.

The assembled vehicle body assembly is transferred to the painting line 500 via the transporting system. FIG. 6 shows part of the final coat station 518. Even after the several steps of the painting line preceding the final coating process, the bar-code label 602 attached to the vehicle body assembly is still fully effective for controlling the operation of the final coating process. The data contained in the bar code of the bar-code label 602 identifies the body color to be painted.

For example, in the shown arrangement of the painting line 500, a bar-code reader 524 is installed at the final coat station 518 to optically obtain the data encoded in the bar-code label 602. The bar-code reader 524 feeds digital signals representative of the read bar-code data to a controller 526. On the basis of the data input from the bar-code reader 524, the controller 526 judges which body color the vehicle should be painted. The controller 526 outputs a control signal to a robot operator 528. The robot operator 528 controls a specific painting robot 530 according to the specific color of paint.

As apparent from FIGS. 4 and 6, the bar-code reader may comprise a light emitter and photo-sensor, instead of the laser scanner employed in the bar-code station in the previous example.

Referring again to FIGS. 7 to 9, the bar-code label 602 is formed by a rigid generally rectangular sheet. In the preferred embodiment, the bar-code label 602 is formed from a thin metal sheet 618. In the metal sheet 618, a combination of wider slots 616 representative of binary number "1" and narrower slots 614 representative of binary number "0" is encoded to correspond to data identifying the model, type and specifications of the vehicle to be assembled. As can be seen in FIG. 7, the bar-code slots are organized into a plurality of groups each representing information about different items such as identification of the assembled components, required operations, body color, body production number and so forth.

In the shown embodiment, the slots are formed in the metal sheet 168 in two parallel, longitudinal rows each containing sixteen bits of data. The ratio of the width of the narrower slot viz-a-viz the wider slot is about 1:2.8−3.

The slots are formed by the punch press 606, which is adapted to punch the wider slots 616 of the first row of slots (hereafter referred to as "slot line A") before punching the narrower slots. After all of the wider slots 616 are punched, the narrower slots 614 in the slot line A are punched. After completing punching operation for the slot line A, then, the narrower slots of the second row of slots (hereafter referred to as "slot line B") are punched before punching the wider slots of the slot line B. After all of the narrower slots are punched, the wider slots of the slot line B are punched.

This slot-punching operation is carried out by the punch press 606 which will be described in detail with reference to FIGS. 10 to 16.

The punch press 606 serving as the bar-code encoding device generally comprises a gripper 620 for manipulating the metal sheet and a pair of punches 622 and 624. The punch 622 is adapted to form the wider slots 616 and the punch 624 is adapted to form the narrower slots 614. The punches 622 and 624 are mounted on a movable frame or ram 626 movable along a pair of supports 628 by a driver unit 630 (not shown). The movable frame 626 is thus movable vertically to form slots by means of the punches by moving down forcefully. As both of the punches 622 and 624 are mounted on the common frame, they are moved down simultaneously each time the slot-punching operation is carried out.

Figure 11:
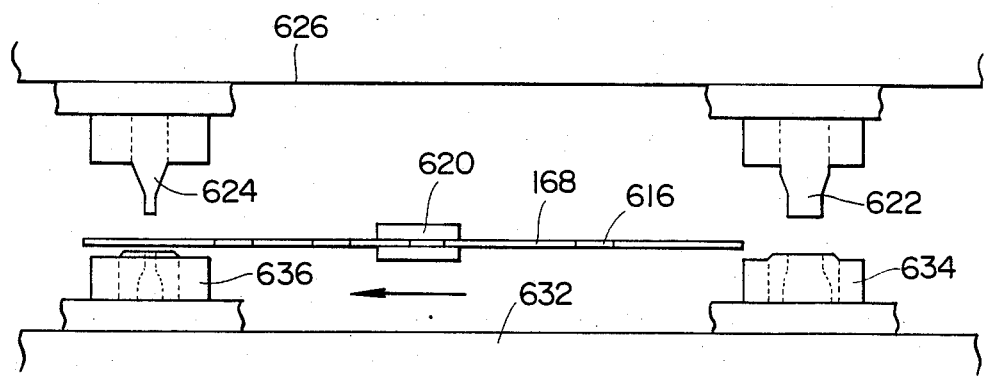
FIG. 11 is a fragmentary illustration showing arrangement of punches for forming wider and narrower slots for the label.

As can be seen in FIG. 11, the punches 622 and 624 are mounted on the movable frame with a fixed separation between them. The distance between the punches 622 and 624 is greater than the length of the metal sheet 618 so that only one of the punches faces the metal sheet at a time.

The movable frame 626 and the punches 622 and 624 can be driven by the driver unit 630 toward and away from a die base 632 with female dies 634 and 636 corresponding to the punches 622 and 624 respectively. The die base 632 and the dies 634 and 636 are fixed to the support frame 638 of the punch press.

The gripper 620 is associated with an electrically controlled actuator 640 operable between a gripping position and a releasing position. The gripper 620 is supported by a laterally movable arm 642 which is associated with an electrically controlled actuator 644. The actuator 644 is mounted on a sliding table 646. A pair of guide brackets 648 extend downward from the lower surface of the sliding table and slidingly engage guide shafts 650, such as ball-spline shafts, which are secured to the support frame at both ends to define the path of the sliding table.

A center bracket 652 has a circular opening 654 with a threaded inner periphery. The center bracket extends from the lower surface of the sliding table 646 between the guide brackets 648. The center bracket 652 engages a threaded drive shaft 656 extending parallel to the guide shafts 650. The drive shaft 656 is associated with a driver motor 658, such as a step motor which may be controlled via an electrical control signal. By means of the driver motor 658, the drive shaft 656 is rotated to drive the sliding table 646 along its path.

Figure 12:
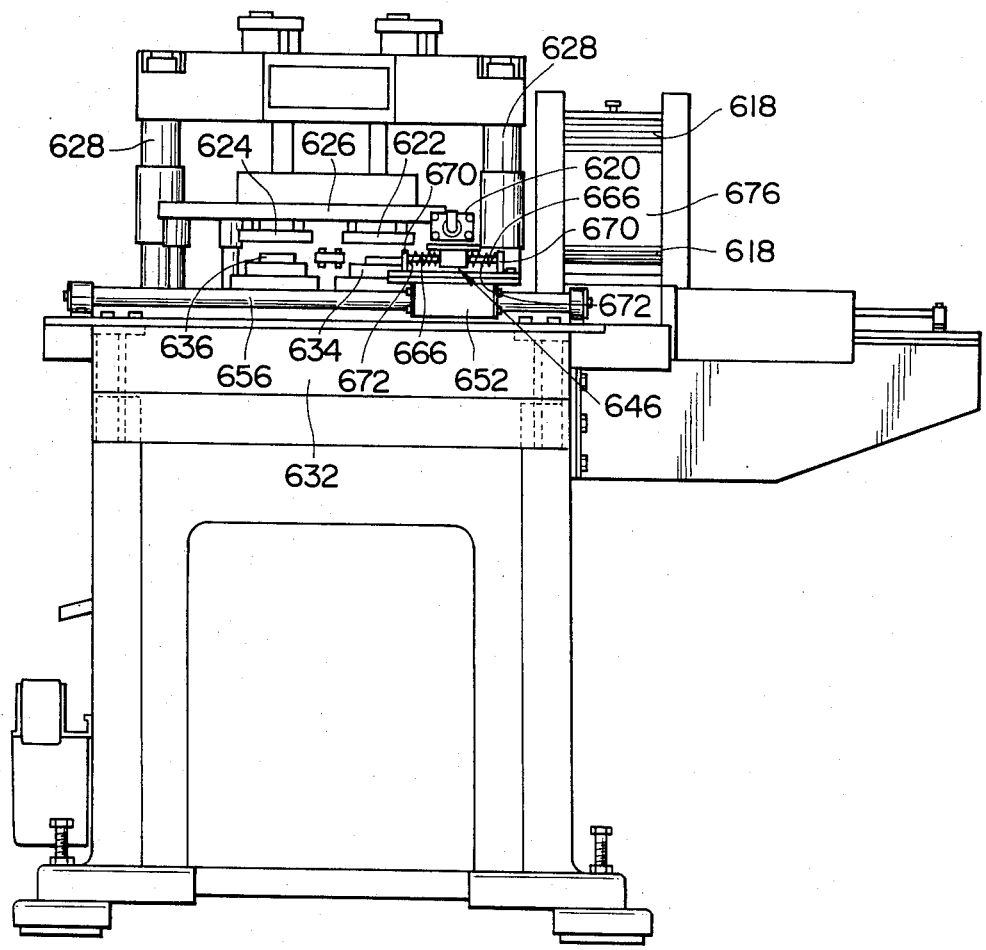
FIG. 12 is a front elevation of the preferred embodiment of the bar-code encoding device according to the present invention.
Figure 14:
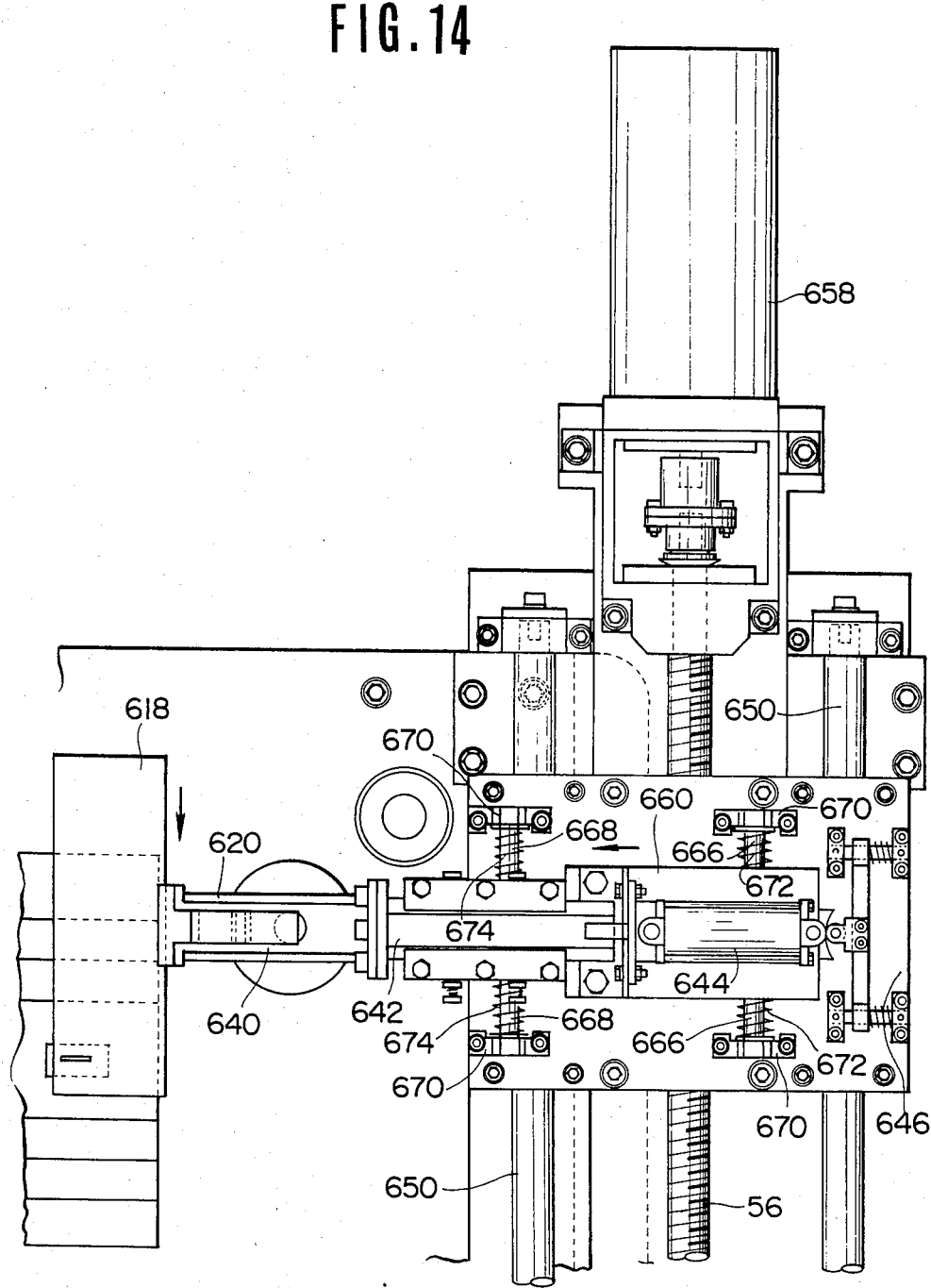
FIG. 14 is an enlarged plan view of the bar-code encoding device of FIG. 12.
Figure 15:
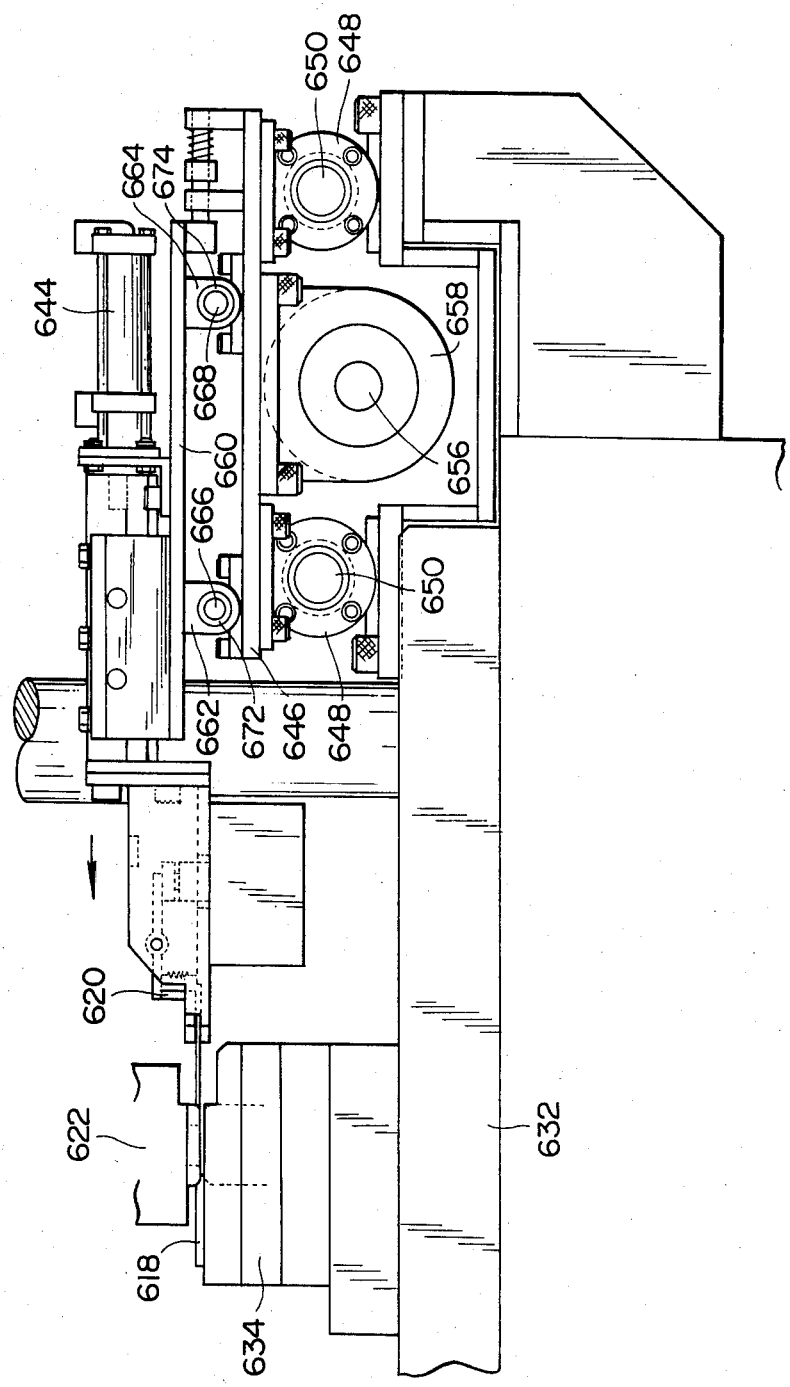
FIG. 15 is a side elevation of the bar-code encoding device as seeing along the arrow in FIG. 14.
Figure 16:
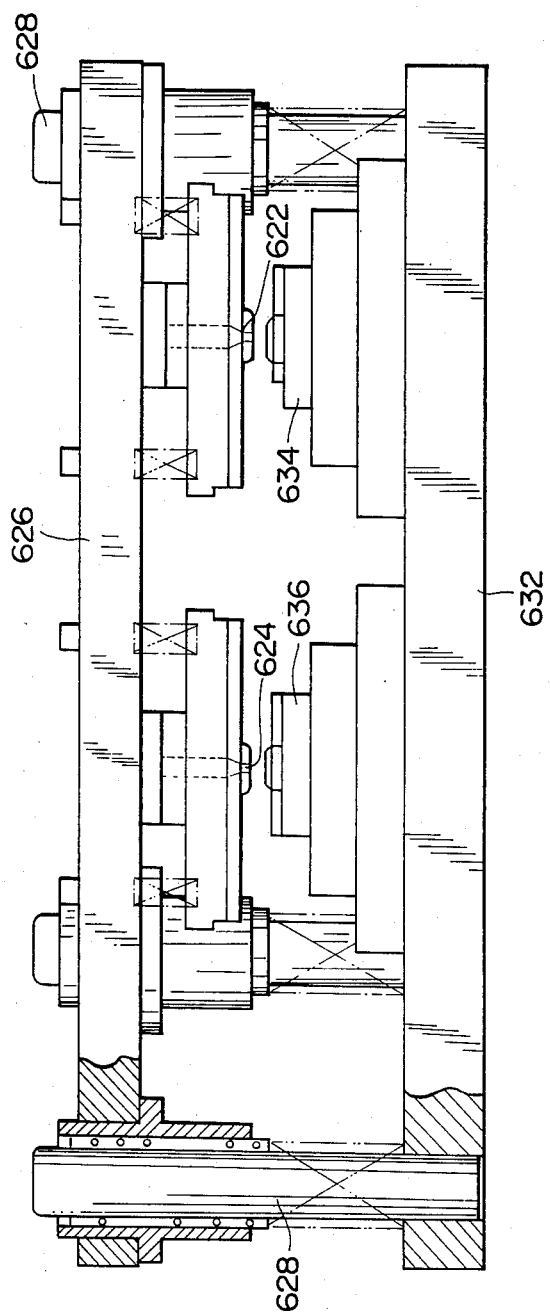
FIG. 16 is an illustration showing punches as mounted on a single common ram.

As can be seen in FIGS. 12 and 14, an actuator base 660 on which the actuator 644 is mounted has a pair of brackets 662 and 664 extending downward from its lower surface. A pair of laterally extending support rods 666 and 668 pass through the brackets 662 and 664 for movably supporting the actuator base. The support rods 666 and 668 are secured to the sliding table 646 by means of brackets 670. A pair of coil springs 672 wound around the support rod 666 on both sides of the bracket 662 exert equal compressive forces on the bracket in order to center the actuator base 660 in its normal position. Likewise, a pair of coil springs 674 are wound around the support rod 668 on both sides of the bracket 664. The coil springs 674 cooperate with the coil springs 672 to hold or return the actuator base 660 to its normal position. Accordingly, the coil springs 672 and 674 have spring constants sufficient to retain the actuator base 660 in its normal position during the slot-forming operation.

The actuator base 660 is thus movable perpendicular to the laterally movable arm 642 when an extraordinarily large load is applied to the gripper overcoming the biasing force of the springs 672 and 674. This movement of the actuator base 660 satisfactorily and successfully absorbs excessive loads applied to the gripper to prevent the device from being damaged due to overstress.

As shown in FIG. 12, the blank metal sheets 618 are stocked in a magazine 676 provided in the punch press. The magazine 676 is associated with a sheet feeder 696 (FIG. 17) for isolating one of the stored blank sheets and for transferring the blank sheet to a position from which the gripper 620 can grip the blank sheet. This position may correspond to the initial position of the gripper 620 to which the gripper is returned after every bar-code encoding operation.

Figure 9:
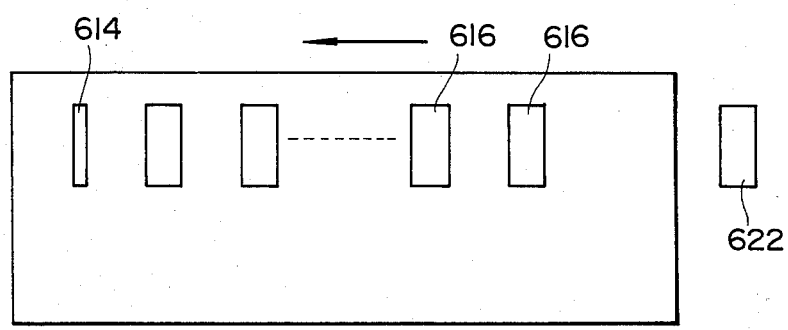
FIG. 9 is an illustration of the bar-code label of FIG. 7 and adapted for description of order of the slots in the preferred method for encoding the bar-code.
Figure 10:
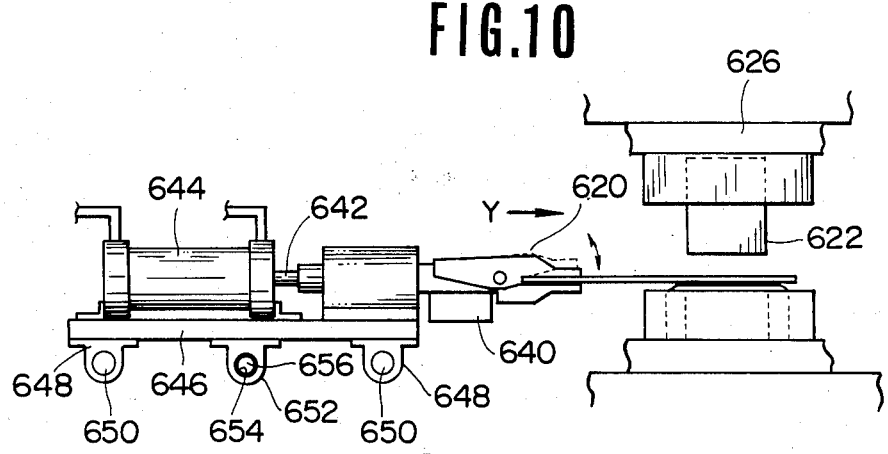
FIG. 10 is a fragmentary front elevation of the preferred embodiment of the bar-code encoding device of the invention, which is adapted to explain the order of forming the bar-code constituting slots in co-operation with FIG. 9.
Figure 17:
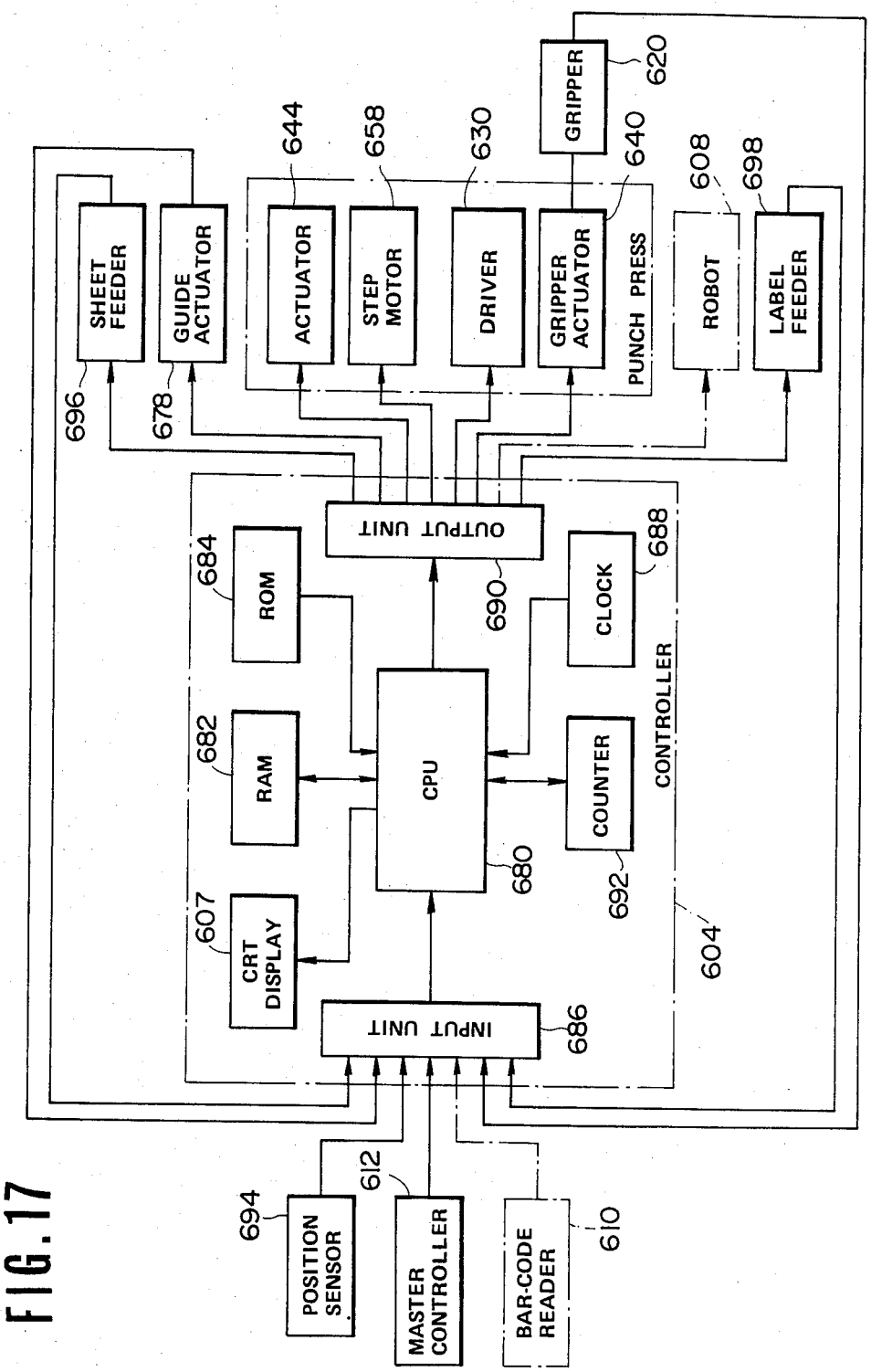
FIG. 17 is a schematic block diagram of the preferred embodiment of a control system for controlling bar-code encoding operation performed by the foregoing bar-code encoding device.
Figure 18A:
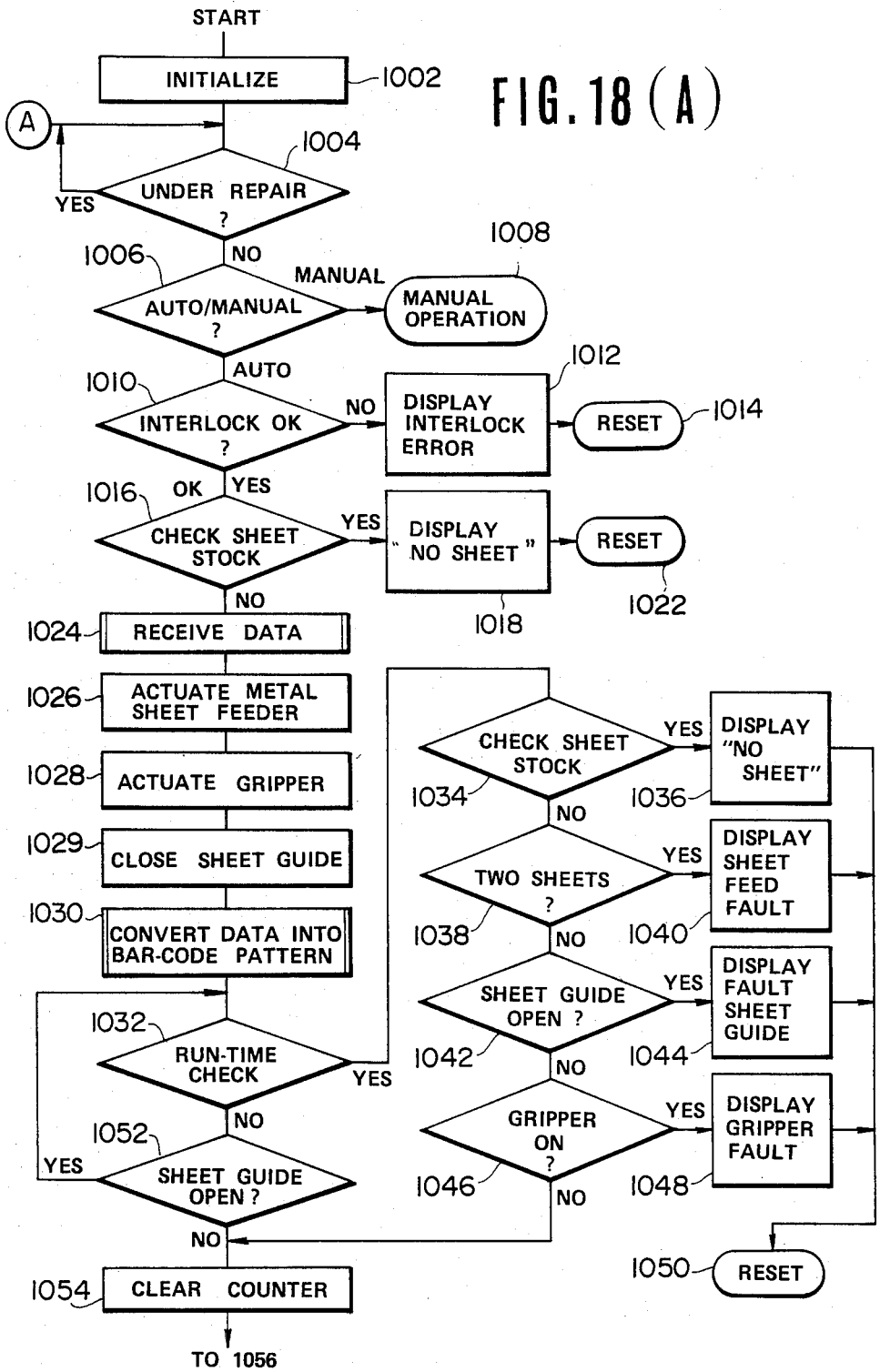
Figure 18C:
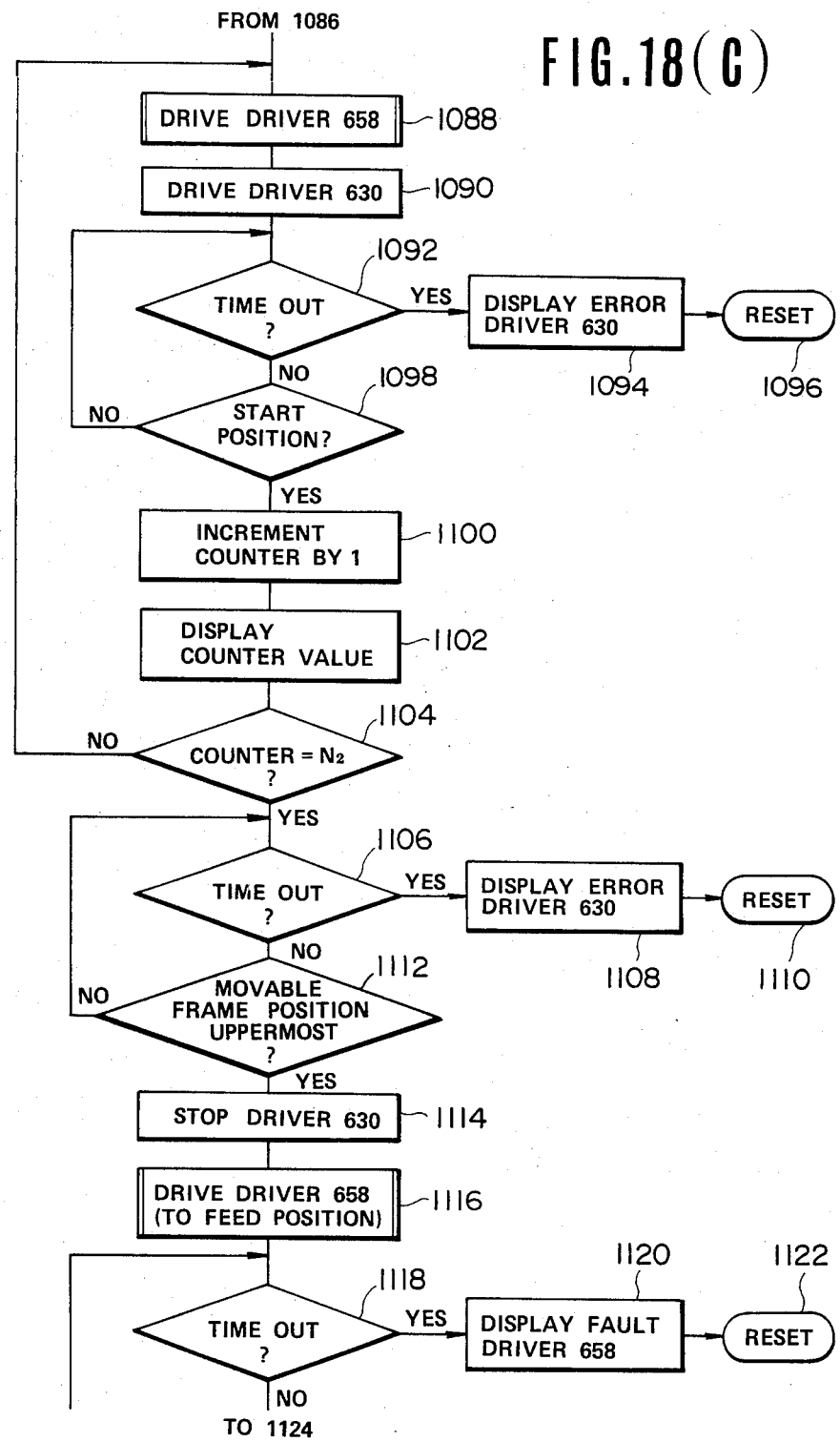
Figure 18D:
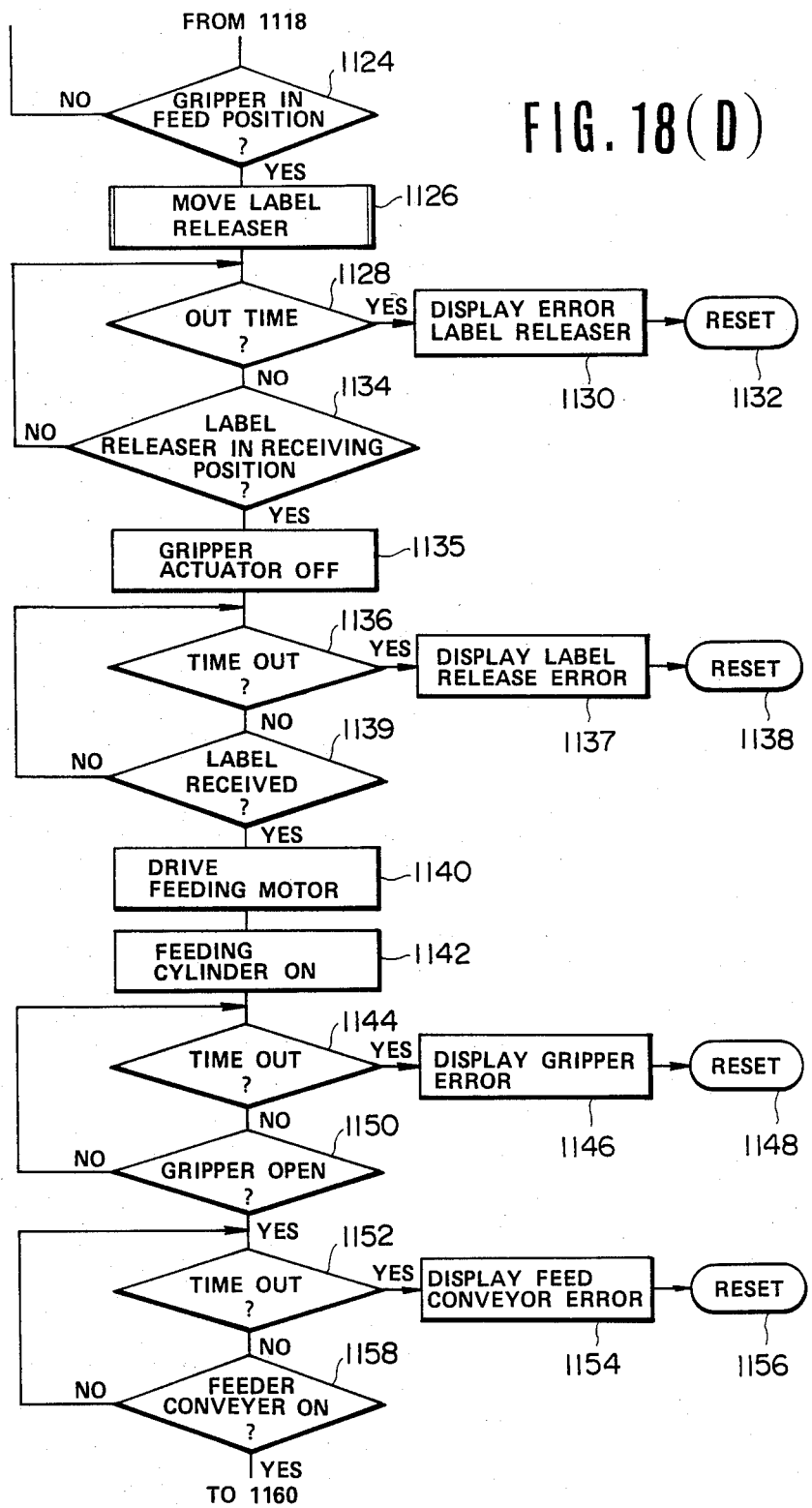
Figure 18E:
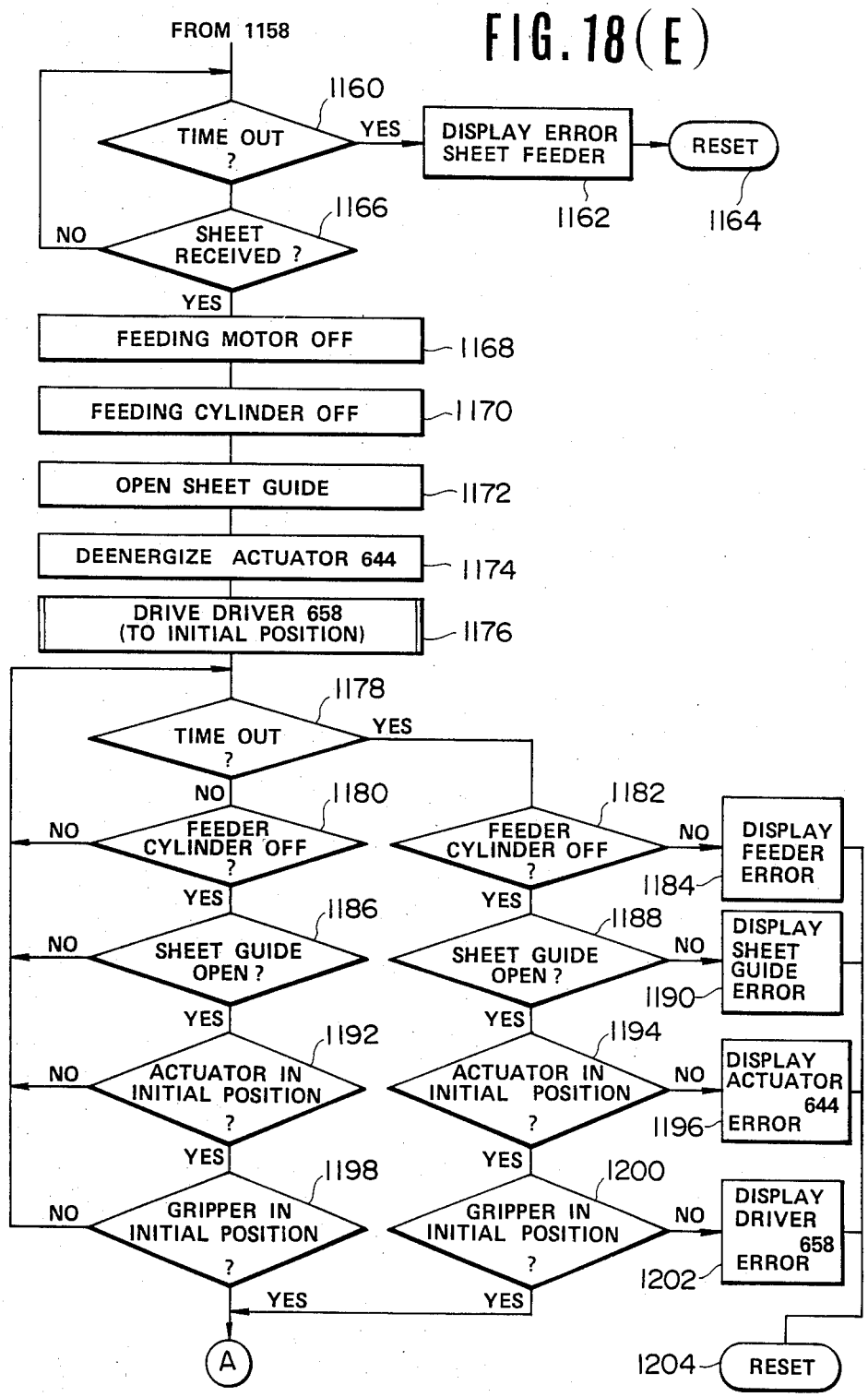

FIG. 17 shows a control system for the punch press 606 for encoding the bar code in the metal sheet 618. As set forth above, the punch press 606 includes the actuator 644 for moving the gripper 620 along the Y-axis, as seen in FIGS. 9 and 10. The punch press 606 also includes the step motor 658 which drives the sliding table 646 via the drive shaft 656 to move the gripper 620 along the X-axis. The gripper 620 is actuated between its gripping and releasing positions by the gripper actuator 640. The driver unit 630 is associated with the movable frame 628 for moving the punches 622 and 624 toward and away from the female dies 634 and 636.

In the punch press, a guide (not shown) is provided for guiding the metal sheets from the magazine 676. The guide is moved to by a guide actuator 678 to open and close the metal sheet path. When the sheet metal path is open, the sheet feed 696 can convey a single sheet to the initial position of gripper 620. After the encoding process, the gripper 620 releases the encoded label 602, which is then conveyed to the attachment robot 608 by a label feeder 698.

The operation of the Y-axis actuator 644, the step motor 658, the gripper actuator 640, the punch driver unit 630 and guide actuator 678 are controlled by control signals from the controller 604. As shown in FIG. 17, the controller 604 comprises a digital processor, such as microcomputer, including CPU 680, RAM 682, ROM 684, an input unit 686, a clock generator 688, an output unit 690 a counter 692 and the CRT display 607. The counter 692 may be incorporated as part of RAM 682 practically, but in the drawing, it has been illustrated separately from RAM for clear understanding.

The master controller 612 is connected to the input unit 686 of the controller 604 to transfer data relating to models, types and specifications of vehicle bodies to be assembled according to the production plan. A position sensor 694 detects the sheet or gripper position along the X-axis and outputs a position signal to the input unit of the controller. Also, the bar-code reader 610 reads the bar code encoded in the bar-code label attached to the vehicle body at the end of the encoding operation. The CRT display 607 may be used to display the data to be encoded into the bar-code label.

The output unit 690 is connected for control output to the guide actuator 678, the sheet feeder 696, the label feeder 698, the Y-axis actuator 644, the step motor 658, the punch driver 630 and the gripper actuator 640. The output unit 690 is also connected to the robot 608 adapted to attach the encoded bar-code label onto the engine compartment assembly. The gripper actuator 640 or the gripper 620 is connected to the input unit to return a feedback signal to the controller.

Figure 19:
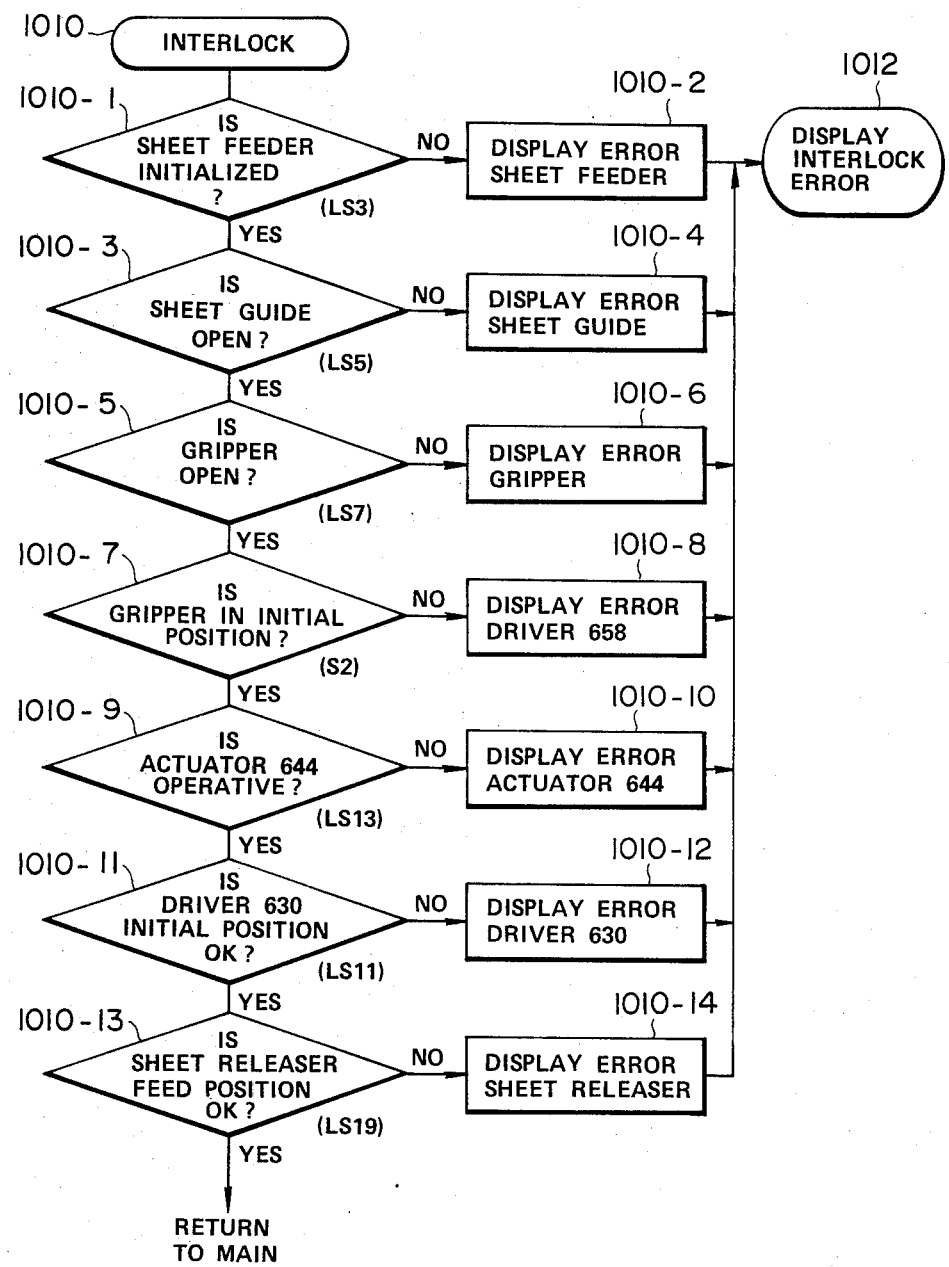

The control system with the foregoing structure, according to the preferred embodiment performs the bar-code encoding operation according to a control program which will be described in detail with reference to FIGS. 18(A) to 18(E) and FIGS. 19 to 22. FIGS. 18(A) to 18(E) together form a flow chart of the punch press control program and FIGS. 19, 20 and 22 show sub-routines for the main program of FIGS. 18(A) to 18(E).

At the initial stage of execution of the control program, after START, the entire system is returned to its initial state in a step 1002. After initialization at the step 1002, the system is checked to see if it is ready to perform the bar-code encoding operation, at steps 1004 to 1022. First the program checks whether the system or the punch press is under repair at the step 1004. If so and thus the answer is YES, then program execution is halted until the repair operation is finished. If the answer is NO, then the program checks whether the system operation mode is AUTO or MANUAL, at step 1006. If the MANUAL mode is selected, then program execution moves to the manual operation state at step 1008 and then terminates. When the answer at the step 1006 is AUTO, then, the interlock condition of the punch press 606 is checked at step 1010. This step 1010 executes as a the sub-routine shown in FIG. 19.

Upon entering the interlock sub-routine, the routine checks at step 1010-1 whether the sheet feeder 696 is in its initial position. If NO, the display 607 is activated to indicate malfunction of the sheet feeder at step 1010-2. If the sheet feeder is in its initial position when checked at the step 1010-1, then, at step 1010-3, the sub-routine checks whether the sheet guide is open. If the sheet guide is in its closed position, malfunction of the sheet guide is indicated on the display 607 at step 1010-4. Otherwise, i.e. when the sheet guide is open, step 1010-5 checks whether the gripper 620 is open. If the gripper 620 is closed, then the gripper error is indicated on the display 607 at step 1010-6. If the gripper is closed, then the X-position of the gripper is checked at step 1010-7. If the gripper is not in its initial X-position due to failure of driver 658, then the driver failure is displayed; otherwise control proceeds to step 1010-9. If the gripper position along the Y-axis corresponds to the inoperative condition of the actuator, then control proceeds to step 1010-10 in which the failure of the actuator 644 is displayed. Otherwise, the actuator 644 is judged to be operative, and so the routine proceeds to check punch position at step 1010-11. If the punches are in their initial positions, the answer at the step 1010-11 is YES and otherwise NO. If NO, failure of driver 630 is displayed at step 1010-12. On the other hand, when the punches are in their initial positions, the sheet releaser 698 is checked to see whether it is in a lowered inoperative position, at step 1010-13. If the sheet releaser 698 is not in the inoperative position, malfunction of the sheet releaser is displayed at step 1010-14.

When the sheet feeder 696, the sheet guide, the gripper 620, the gripper position with respect to both of the X- and Y-axes, the punch positions and the sheet releaser 698 are all OK, then the answer at the step 1010 is OK and then program execution returns to step 1016 of the main program. On the other hand, if one of the foregoing is not OK, then INTERLOCK ERROR is displayed at step 1012 and the system is reset at step 1014.

When the interlock is OK as judged at the step 1010, then the sheet magazine 676 is checked to see whether sheets are available. If not, NO SHEET is displayed at step 1018 and then the system is reset at step 1022.

When all the check items are OK, then the input interface is prepared for receiving data from the master controller 612. The data from the master controller 612 is received at step 1024. The received data from the master controller 612 is temporarily stored in RAM 682 or an appropriate register in the controller 604. At step 1026, the sheet feeder 696 is actuated. The gripper is actuated to clamp the sheet from the magazine in step 1028 and then the sheet guide is closed again in step 1029. After this, conversion of the received digital data into a corresponding bar-code pattern is performed at step 1030.

In the step 1030, the sub-routine as shown in FIG. 20 is carried out. At step 1030-1 the digital bytes are converted into the corresponding groups of bar-code bits. Then, maximum frequency DGSW is read in at step 1030-2, and minimum frequency DGSW is read in at step 1030-3. After this, actuation speed or acceleration characteristics of the step motor 658 are read in at step 1030-4. Then, at step 1030-5, arithmetic operations are carried out to determine the drive pattern of the step motor 658 required to form the bar-code derived in step 1030-1. The determined driving pattern of the step motor is set in RAM or appropriate registers in the controller, at step 1030-6.

Figure 21:
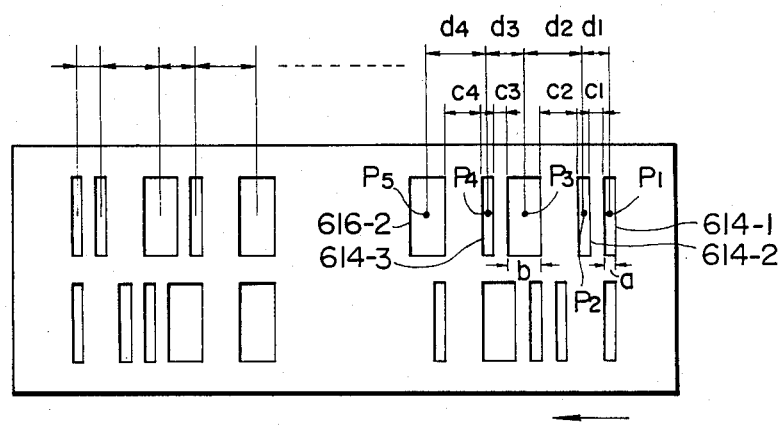
FIG. 21 is an explanatory illustration showing determination of locations of bar-code constituting slots.

Assume that the bar-code pattern derived from the digital data fed from the master controller is as illustrated in FIG. 21, and that the sliding table 646 is moved along the X-axis at a distance d per each cycle of the step motor 658 and the step motor is driven through one cycle of revolution in response to each input pulse. The arithmetic operations at the step 1030-5 are adapted to determine the sequence of pulse groups to be sent to the stepper motor to move the sliding table 646 such that first the wider slot positions of the A-line pass under the wide punch, the narrower slot positions of A-line pass under the narrow punch, the narrower slot positions of B-line pass under the narrow punch in the opposite order and finally the wider slot positions of B-line pass under the wide punch. Specifically, in the example shown in FIG. 21, the first step would be to move the blank sheet such that the wide punch is centered over the center $P_3$ of the first wider slot, followed by centering over the center $P_5$ of the second wider slot, etc. After the last wider slot, the sheet would be shifted through a distance equal to the spacing between the punches minus the distance between the centers of the last wider and first narrower slots. Thus, given the widths a, b of the narrower and wider slots and inter-slot distances $C_{1-4}$ of FIG. 21, the first number derived in step 1030-5 would be $(c_1+c_2+a/2+a+b/2)/c$ (assuming the initial gripper position is at the point $P_1$), representing the distance to the first wider slot, and the next number would be $(c_3+c_4+a+b)/c$. The same calculations would be performed for the B-line, but starting from the left-hand narrower slot and ending with the right-hand wider slot as seen in FIG. 21.

After the step 1030-6 for storing the data indicative of the driving pattern of the step motor 658, the program execution returns to the main program. Immediately after returning to the main program, the elapsed run-time of the program is checked at step 1032 to see whether the time exceeds a given time limit. If so, the magazine is again checked to see if sheets are available, at step 1034. If there are no sheets left, this fact is displayed on the display at step 1036. If some sheets are present, the gripper 620 is checked to see if it is holding more than one sheet at step 1038. If gripper 620 is gripping more than one sheet, the gripper malfunction is displayed on the display at step 1040. If only one sheet is gripped by the gripper, the sheet guide is checked to see if it remains in its open position at step 1042. If the sheet guide is still open, this error condition is displayed at step 1044. If the sheet guide is closed, the gripper 620 is checked to see if it is in the gripping position; if not, this gripper error is displayed at step 1046. Otherwise, the program execution goes to step 1054 to clear the counter 692. On the other hand, if one of the steps 1036, 1040, 1044 and 1048 is executed, the system is reset at step 1050.

When the result of checking run-time at the step 1032 is NO, then, the sheet guide is checked at step 1052 to see if it is in its open position. If the sheet guide is in its open position, control returns to the step 1032 to check time again. After the sheet guide eventually closes, the counter 692 is cleared for use later at the step 1054.

In the first stage of the bar-code encoding operation for the A-line of slots, the wider slots are formed before the narrower slots. Therefore, in the first stage which lasts until all of the wider slots 616 are formed in the metal sheet, the punch 622 serves only to form slots 616 in the A-line of slots. In the second stage after all the wider slots in the A-line have been formed, then the punch 624 becomes active to form the narrower slots 614 in the A-line.

First, the step motor 658 is driven in step 1056 according to the predetermined driving pattern to move the sheet in order to form the next scheduled slot. As set forth above, in the case of the A-line, the wider slots are formed before the narrower slots. Therefore, in the first state represented by steps 1056–1072, the sheet is moved at the step 1066 in the X-direction under the punch 622 in order to form the next slot 616. At the step 1056 in the first stage, the step motor 658 is operated to move the sheet to the next slot 616 position and, in the second stage, it drives the sheet to the next narrower slot 614 position. In step 1056, a sub-routine shown in FIG. 22 is executed.

Immediately after entering the sub-routine, the stored driving pattern for the step motor is consulted to determine the number n of pulses required to move the sheet to next scheduled position, at step 1056-1. The read pulse number will be held in an appropriate register in the controller. According to the set value, the controller 604 feeds pulses through its output unit 690 to the step motor 658 to drive the latter for the given number of cycles of revolution, one at a time, at step 1056-2. A clock signal from the clock generator 688 is then counted at step 1056-3 in order to measure a period of greater than 40 ms. After time expires, the output of the pulse is stopped at step 1056-4. Thereafter, the counter clock number is cleared at step 1056-5. Then the position sensor signal is checked against the next scheduled punching position at step 1056-6. If the gripper 620 is at the position at which the next punching operation will be performed, the process returns to main program. Otherwise, execution of sub-routine returns to the step 1056-2.

In the step 1058, the punches 622 and 624 are simultaneously operated so that whichever one of the punches 622 and 624 opposes the metal sheet can form the corresponding wider or narower slot. After the step 1058, the elasped time is checked at step 1060. If a predetermined time has elapsed, malfunction of the driver 630 is displayed on the display 607 at step 1062 and then the system is reset at step 1064. If the slot is formed within the given tine period and thus timely operation is judged at the step 1060, the sensor signal from the position sensor 694 is read. At step 1066, the gripper 620 position is checked to see whether the gripper is in the position at which the last slot was formed in the sheet in the immediately preceding punching operation. This step is necessary to allow for possible rebound of the sliding table 646 due to the force of the punch press. If positional deviation is detected, process control returns to the step 1060 to check time again until the table 646 settles.

The value of the counter 692 is incremented by 1, at step 1068 and the incremented counter value is displayed at step 1070. At step 1072, the counter value is compared with $N_1$, which is the number of slots to be formed in the A-line. If the counter value is less than $N_1$, the process returns to the step 1056. When the counter value reaches $N_1$, the driver 630 is stopped at step 1074.

Thereafter, the actuator 644 becomes active at step 1076 to move the gripper with the metal sheet in the Y-direction in order to shift the metal sheet to the position in which B-line slots can be punched. Thereafter, the step motor 658 is driven to move the sheet to the initial B-line bar-code position, at step 1078. At step 1080, elapsed time is again checked. If time is out at the step 1080, then malfunction of actuator 644 is displayed at step 1082 and subsequently the system is reset at step 1084. If time out is not detected, then the sheet position is checked at step 1086 to judge whether it is in the position for forming B-line slots yet. If not, control returns to the step 1080. Once the sheet is in position for forming B-line slots, then driver 658 is actuated to shift the sheet to the position of the first narrower slot in step 1088 (refer to the subroutine of FIG. 22) and, the actuator 630 is actuated to form the first narrower slot 614 at step 1090.

As set forth above, the B-line bar-code is formed by punching out the narrower slots before the wider slots. Therefore, the initial position of the sheet for the B-line slot punching operation has to correspond to the first narrower slot position of the B-line of the sheet.

After the step 1090, execution time is again checked at step 1092. If time is out at step 1090, malfunction of driver 630 is displayed at step 1094 and the system is reset at step 1096. If time is not out, the sheet position indicated by the position sensor signal is checked at step 1098. If the sensor signal indicates that the position is offset from the scheduled position, control returns to step 1092 to check time again. Otherwise, the counter value of the counter 688 is incremented by 1, at step 1100. At step 1102, the counter value is displayed similarly to the step 1070. In step 1104, the counter value is compared with $N_2$, which is representative of overall number of slots to be formed on the metal sheet. If the counter value is less than $N_2$, control returns to the step 1088. The steps 1088 to 1104 constitute a loop for forming B-line slots. When the counter value checked at the step 1104 reaches $N_2$, time is checked at step 1106. If time is out at the step 1106, then malfunction of the driver 630 is displayed at step 1108. Thereafter, the system is reset at step 1110. If the answer of the step 1106 is NO, i.e., if the driver 630 is still working properly, the movable frame position is checked to see if it has been returned to is uppermost position at step 1112. If not, control returns to the step 1106. After the movable frame reaches its uppermost position, the driver 630 is stopped at step 1114.

Thereafter, the sliding table 646 with the gripper 620 and the bar-code encoded sheet, i.e. the finished bar-code label 602, is returned to the feed position by actuation of the step motor 658 at step 1116. At step 1118, elapsed time is again checked. If time is out, the malfunction of the step motor 658 is displayed at step 1120. Then the system is reset at step 1122. If time has not expired, the position sensor signal is checked to determine whether the gripper is exactly positioned at the feed position, at step 1124. If not, control returns to the step 1118. Otherwise, the label releaser 698 is moved to the feed position at step 1126.

After the step 1126, run time is checked at step 1128. If time is out, malfunction of the label releaser is indicated on the display 607 at step 1130. The system is then reset at step 1132. On the other hand, if the time limit has not been exceeded, the position of the label relaaser is checked at step 1134. If the label releaser is not yet in the receiving position, control returns to the step 1128. After the label releaser has moved to the receiving position, the gripper closing actuator is turned off at step 1135 to allow the finished label to fall onto the sheet releaser. Time is checked at step 1136 in conjunction with a check at step 1139 to see whether the label has been received by the sheet releaser. If the label is not received within a predetermined time, the label release error is displayed at step 1137 and the system is reset at step 1138. If the label is released within the predetermined time, the motor for a feeding conveyor 696 becomes operative at step 1140 and a feeding cylinder is turned on at step 1142.

Thereafter, time is again checked at step 1144. When time extends beyond a given period, then malfunction of gripper 620 is displayed at step 1146 and the system is reset at step 1148. If time has not expired, the gripper 620 is checked again to see if it is in the releasing position, i.e., open, at step 1150. If the gripper is still in the gripping position, the process returns to the step 1144 and otherwise proceeds to step 1152, at which time is again checked. If time is out at the step 1152, then, malfunction of sheet conveyor 696 is displayed at step 1154. Thereafter, the system is reset at step 1156. If time is not out at the step 1152, then feeder conveyor is checked to see if it is operative. If the feeder conveyor is inoperative, control loops between the steps 1152 and 1158 until the feeder conveyor becomes operative or time-out is detected. If the feeder conveyor is operative, time is checked at step 1160. If time over is out, malfunction of feed conveyor 696 is indicated on the display 607 at step 1162 and then the system is reset at step 1164. If time is not out, the robot 608 is checked to see if it has received the bar-code label 602 via the feeder conveyor. If the robot has not received the bar-code label, then control returns to 1160 to define a loop between the steps 1160 and 1166 which waits until the robot receives the bar-code label or until time is out. If when the robot receives the bar-code label in time, the label feeder 696 is turned off at the step 1168, the feeding cylinder is deactivated to return the conveyor to its initial. Next, lower position at step 1172, the sheet guide is closed at step 1174, and the pulse motor 658 is driven to return the sliding table with the gripper to its initial position at step 1176.

After the step 1176, time is again checked at step 1178. If time is not out, the feeder cylinder position is checked to see if it has returned to its lower position at step 1180. If it is still operative, control loops between the steps 1178 and 1180 to wait until the feeder cylinder is deactivated fully. When the inoperative position of the feeder cylinder is confirmed at the step 1180, the sheet guide is checked to see if it is open at step 1186. If the result of checking at the step 1186 is NO, control loops through the steps 1178, 1180 and 1186 until the sheet guide is open. After the sheet guide is open, the actuator 644 is checked to see if the gripper is in its initial Y-position at step 1192. If the gripper is not in its initial Y-position, a loop is established between the steps 1178, 1180, 1186 and 1192 until the gripper is returned to its the initial position. After the gripper reaches its initial position, the gripper position with respect to X-axis is checked at step 1198. If initialization of the gripper with respect to X-axis is not completed, control loops through steps 1178, 1180, 1186, 1192 and 1198 until completion of the initialization of the gripper. When the gripper reaches its initial position, control returns to the step 1004 to repeat the bar-code encoding operation.

On the other hand, if time is out when checked at the step 1178, the feeder cylinder position is checked at step 1182, the sheet guide position is checked at step 1188, the gripper Y-position is checked at step 1194 and the gripper X-position is checked at step 1200. The checking operations performed in the steps 1182, 1188, 1194 and 1200 are all identical to those performed in the foregoing steps 1180, 1186, 1192 and 1198 respectively. If all of the checking results in the steps 1182, 1188, 1194 and 1200 are YES, control returns to the step 1004 to repeat the bar-code encoding operation as set forth above.

On the other hand, when the answer at the step 1182 is NO, then malfunction of the feeder cylinder is indicated on the display 607 at step 1184. Similarly, malfunction of the sheet guide, the actuator 644 and the step motor 658 are respectively displayed at steps 1190, 1196 and 1202. After any of these error display steps, the system is reset at step 1204.

In summary of the foregoing control operation, the punch press 606 first forms the wider slots in the A-line at the scheduled positions according to the bar-code pattern derived from data input by the master controller 612. Therefore, at the first stage, the gripper 620 remains aligned under the punch 622 until all of the wider slots 616 are formed. After all of the wider slots 616 in the A-line have been formed, then the gripper 620 is moved to the position below the punch 624 to form the narrower slots 614. The gripper 620 is moved along the X-axis according to the determined drive pattern of the step motor to position the sheet at positions corresponding to the determined bar-code pattern.

After the A-line slots have been punched, the actuator 644 is activated to move the gripper along the Y-axis in order to shift the sheet to a position suitable for punching the B-line slots. The narrower B-line slots 614 are formed before the wider slots. The punch 624 is used to form the narrower slots 614 in the B-line. After completion of the narrower slot forming operation, the sheet is transferred in the X-direction to the location in the punch press in which the sheet opposes the punch 622 in order to form the wider slots 616 of the B-line.

When the bar-code encoding operation is finished, the bar-code label is fed to the robot 608 which attaches the former to the wheel house of the engine compartment assembly 102 via the feeder conveyor. After attaching the bar-code label to the engine compartment assembly, the bar-code reader installed at the bar-code station 600 reads the bar code in the label to supply the read data to the controller 604. The controller compares the data fed from the bar-code reader 610 with the data from the master controller 612 and stored in a register or RAM in order to confirm that the encoded data correctly corresponds to the data indicative of the model, type and specifications of the vehicle body to be assembled.

Bar-code labels prepared according to the foregoing process by means of the punch press are particularly effective in manufacturing processes including painting processes, in which conventional printed bar-code labels are wholly useless. The data encoded in the bar-code label according to the present invention can be read by means of an optical reader, such as the combination of a light-emitting element and photosensitive element, as set forth above, or by means of a laser scanner.

In addition, fabrication of the bar-code label according to the present invention is sufficiently efficient to allow repeated, continuous encoding of bar-codes onto blank labels. Such efficiency is very important in a manufacturing processes in which the time period allowed for preparation is very short, such as in the automotive industry. Furthermore, according to the present invention, since the narrower slots and the wider slots are formed in separate, successive groups, the operation of the encoding device can be simplified to provide satisfactory efficiency.

Figure 23:
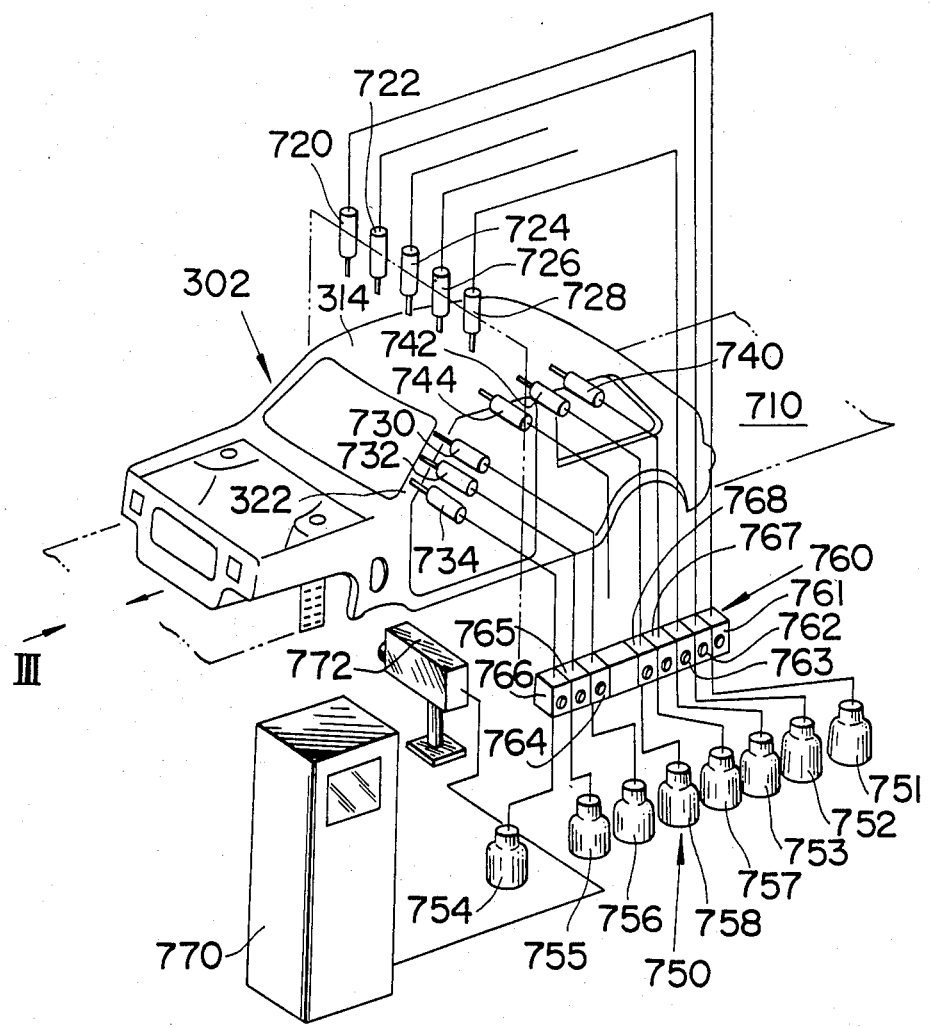
FIG. 23 is an illustration of a color mark section in the system of FIG. 1.
Figure 24:
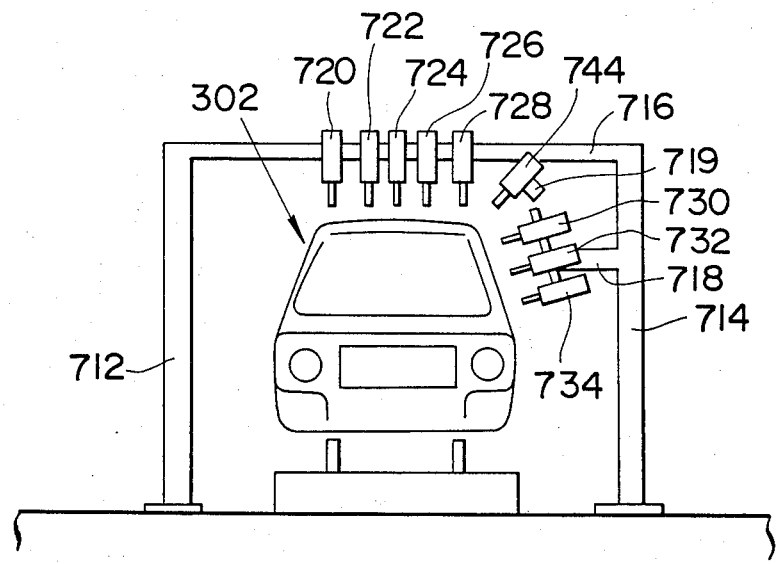
FIG. 24 is a front elevation of the color mark section of FIG. 23.

FIGS. 23 and 24 show details of the color mark station 700, which is interpositioned between the body assembly line 300 and the metal line 400. The color mark section 700 serves to apply color marks in different colors to the body assembly 302 to facilitate identification of metal line components by the line workers.

As set forth above, in the metal line 400, right and left side doors 404, right and left fenders 406, a back door 408 and so forth are attached to the body assembly 302 to form the assembled vehicle body. Though the disclosure has been directed to a vehicle having only front side doors and a back door sealing a hatch-back gate, the control system according to the present invention is applicable not only to this specific vehicle structure but also to any model of vehicle, such as sedans, coupes and so forth.

As can easily be appreciated, depending on the model to be assembled and the specification thereof, each metal component, i.e. side doors, fenders, back doors, etc., supplied by respective storage areas as pre-assemblies, are chosen in the metal line to be added to the body assembly after the body assembly operation 300.

Figure 25:
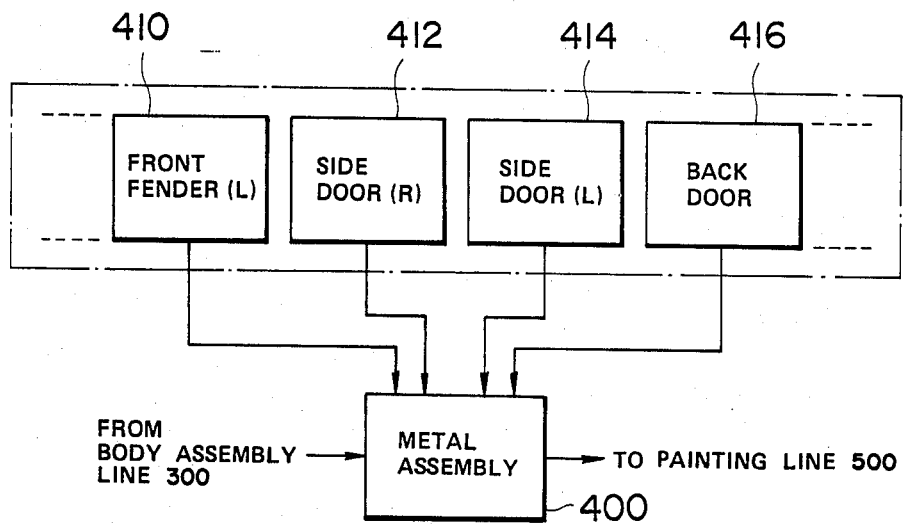
FIG. 25 is a schematic illustration of the arrangement in the metal line in the control system of FIG. 1.

FIG. 25 shows the storage areas 410, 412, 414, 416, each storing right-side front fenders, right-side side doors, left-side side doors, back doors or the like. To each of the storage areas 410, 412, 414 and 416, various types of fenders, side doors and back doors are supplied as pre-assemblies from respective pre-assembly lines. Furthermore, each of the storage areas 410, 412, 414 and 416 has a plurality of sections in which the fenders, side doors and back doors are sorted according to type and construction.

In order to identify the specific metal line components to be assembled to the specific body assembly and make it easier for a line worker to confirm whether the metal components match those identified in the instructions on the bar-code label 602, color marks 418, 420 and 422 are applied to each of the fenders 406, side doors 404 and back doors 408. The color marks are of variable color depending on the type of the metal components. The color marks are applied to the metal components at the end of each pre-assembly line and before conveyance to the corresponding storage area.

Corresponding color marks 702, 704 and 706 are applied to the front end of the roof 314, the front pillar 322 and the side edge of the roof of the body assembly 302. The color mark 702 on the front end of the roof 314 identifies the type of fender 406 to be added. The color mark 702 would have the same color as that on the appropriate fender and so by matching colors, the required fender can be assembled to the body assembly. The color mark 704 on the front pillar 322 identifies the type of side door 404 to be added. Similar to the color mark 702, the color mark 704 has the same color as that on the side door which is to be attached. The color mark 706 on the side edge of the roof 314 identifies the type of back door 408 to be assembled to the body assembly.

An example of this identification will be given below for better understanding.

Assume that the vehicles to be assembled in the sequence of lines are of types A, B, C, D and E; the corresponding front fenders 406 are of types $F_a$, $F_b$, $F_c$; the corresponding side doors 404 are $D_a$, $D_b$, $D_c$; and the corresponding back doors 408 are $B_a$ and $B_b$, and the various types of vehicles are assembled according to the following table:

| Vehicle type | Fender | Side Door | Back door |
| --- | --- | --- | --- |
| A | $F_a$ | $D_a$ | $B_a$ |
| B | $F_b$ | $D_b$ | $B_a$ |
| C | $F_c$ | $D_c$ | $B_a$ |
| D | $F_b$ | $D_a$ | $B_b$ |
| E | $F_a$ | $D_a$ | $B_b$ |

As will be appreciated from the above table, when the vehicle of type A is to be assembled, a type $F_a$ fender 406, a type $D_a$ side door 404 and a type $B_a$ back door 408 are to be used. Furthermore it should be noted that the type $F_a$ fender is commonly applicable to vehicles of types A and E, and the type $D_a$ side doors are applicable to vehicles of types A, D and E. Therefore, some of the metal components are commonly used in various types of vehicles.

In order to identify the type of each metal component, color marks on the vehicle according to the following table are used:

| color mark 702 | $F_a$:white | $F_b$:yellow | $F_c$:orange | color mark 418 |
| --- | --- | --- | --- | --- |
| color mark 704 | $D_a$:red | $D_b$:blue | $D_c$:pink | color mark 420 |
| color mark 706 | $B_a$:green | $B_b$:brown | | color mark 422 |

Therefore, for vehicles of type A, front fenders 406 with the color mark 418 in white, side doors 404 with the color mark 420 in red and back doors 408 with the color mark 422 in green are used. Similarly, to assemble a vehicle of type C, front fenders 406 of type $F_c$ (the color marks 702 and 418 are both orange), side doors 404 of type $D_c$ (the color marks 704 and 420 are both pink) and back doors 408 of type $B_a$ (the color marks 706 and 422 are both green) are assembled to the body assembly 302.

In order to apply the color marks 702, 704 and 706 to the body assembly, the system according to the shown embodiment is provided with a section 700 for applying the color marks. As shown in FIGS. 23 and 24, the color mark station 700 is located along the conveyor belt 708 between the body assembly line 300 and the metal line 400.

A pair of support frames 712 and 714 extend vertically on both sides of the transporting conveyer 210 and support a lateral frame 716 extending between the vertical support frames 712 and 714 across the transporting conveyer, as shown in FIG. 24. A first group of spray nozzles 720, 722, 724, 726, 728 are supported on the lateral support frame at a point facing the front end of the roof 314 of the body assembly 302 on the conveyor. The first group of spray nozzles are adapted to apply the color mark 702 identifying the type and specification of the front fender 406 to be added. A second group of spray nozzles 730, 732 and 734 are so located as to face the front pillar 322 and are supported by a lateral extension 718 of the vertical support frame 714. The second group of spray nozzles 730, 732 and 734 are adapted to apply the color mark 704 to the front pillar of the body assembly 302 to identify the type and specification of the side door 404 to be added. A third group of spray nozzles 740, 742 and 744 are located opposite the vehicle roof side edge on a longitudinal extension 719 of the vertical support frame 714. The third group of spray nozzles 740, 742 and 744 are adapted to apply the color mark 706 to the side edge of the roof 314 to identify the type and specification of the back door 408 to be added.

Each of the spray nozzles is connected to a paint reservoir tank 750 via an electromagnetically operated control valve 760, such as a solenoid valve. The paint within each reservoir tank 750 is pressurized to a predetermined pressure so that the paint is injected through the spray nozzle whenever the control valve 760 opens. Each control valve 760 is connected to a controller 770 comprising a digital processor and is responsive to a control signal from the controller to supply and shut off the supply of the paint. In turn, the controller 770 is connected to an optical reader 772 adapted to read the bar code in the bar-code label 602 attached on the wheel house of the body assembly. The bar-code reader 772 feeds a binary-code signal representative of the instructions and information relating to the model, specification and so forth for the vehicle body to be assembled, to the controller 770.

The controller 770 may include a display 774 for displaying the data read by the bar-code reader 772 in addition to controlling the control valves 761, 762, 763, 764, 765, 766, 767 and 768 to selectively apply the color marks 702, 704 and 706 to the body assembly.

The paint reservoir tanks 751, 752, 753, 754, 755, 756 757 and 758 contain differing colors of paint corresponding to the colors of the color marks 702, 704 and 706.

In operation, the transporting conveyer 710 temporarily stops at the color mark station 700 for a predetermined period of time. At this position, the bar-code label 602 on the wheel house of the body assembly 302 is positioned opposite the bar-code reader 772. The bar-code reader 772 optically reads the bar-code data and feeds the read data to the controller 770. The controller 770 judges the type and specification of the fender 406, the side door 404 and back door 408 to be assembled to the specific body assembly currently at the color mark section, based on the input data from the bar-code reader. According to this judgment, the controller actuates one of the control valves 761, 762 and 763 to feed paint to one of the first group of spray nozzles 720, 722, 724, 726 and 728 in order to apply the color mark 702 with the specific color corresponding to the type and specification of the required front fender. Similarly, according to the judgment, the controller 770 feeds a control signal to one of the control valves 764, 765 and 766 to feed the selected color of paint to the appropriate one of the spray nozzles 730, 732 and 734 in the second group in order to apply the color mark 704 to the front pillar 322 of the body assembly. In this case, the color of paint to be fed to the selected one of the spray nozzles 730, 732 and 734 represents the type and specification of the side door identified by the bar-code and to be assembled to the body assembly.

The controller 770 further feeds a control signal to one of the control valves 767 and 768. Accordingly, paint from the corresponding paint reservoir tank 757 or 758 of a color identifying the selected type and specification of the back door 408 is fed to corresponding one of the spray nozzles 740, 742 and 744 to apply the color mark 706 to the side edge of the roof 314.

After the predetermined period ends and the color marks 704, 704 and 706 have been applied to the body assembly, the transporting conveyer resumes operation to transport the body assembly 302 with the color marks to the metal line 400.

In the metal line, the front fender 406, the side doors 404 and the back door 408 having color marks 418, 420 and 422 matching the colors of the color marks 702, 704 and 706 are removed from the respective storage areas 410, 412, 414, 416. When the color marks 418 and 702 match, the front fenders 406 are assembled to the body assembly 302. Similarly, when the color marks 420 and 704 match, the side doors 404 are added and when the color marks 422 and 706 match, the back door or doors 408 are assembled to the body assembly 302.

As will be appreciated, the color marks applied to both the body assembly and each of the metal components do not need to be so large as to increase production costs. The size of the color mark need only be big enough for the line worker to see easily. Furthermore, it would be preferable to use soluble paint so that the color marks can be dissolved and removed in the first process in painting line 60.

According to the present invention as set forth above, identification of the metal component to be assembled to the vehicle body base can be provided in a visually recognizable form to make the worker's judgment easier. This improves the productivity of the manufacturing line of the automotive vehicle body.

Although the specific embodiment has been described above in order to disclose the invention, the invention is applicable to any manufacture wherein various types and specifications of products are produced from a plurality of components, each of which may vary in construction and/or specification. For example, though the specific embodiment has been directed to control of the metal line operation in vehicle body assembly, the same or similar procedure may be applied to any of the vehicle body assembly lines. Furthermore, similar systems may be applied to identifying components, such as a dashboard, chairs, head lamps and so forth in a finishing line in which the vehicle is finished.

Returning to FIGS. 1 to 6, the bar code contained in the bar-code label attached to the engine compartment assembly 102 is read by means of a bar-code reader 900 provided in each of the floor assembly line 200, the body assembly line 300, the metal line 400 and the painting line 500. As shown in FIG. 4, the bar-code reader 900 provided in the body assembly line 300 comprises a light source 902, such as a light bulb, and a photo sensor 904. The light source 902 and the photo sensor 904 are arranged on opposite sides of the transporter conveyor. Since the bar-code label 602 has two groups of aligned slots 614 and 616, the light source 902 has two light bulbs 906 and 908. The light bulbs 906 and 908 are so arranged as to oppose respective groups of aligned slots 614 and 616 in the bar-code label 602 when the body assembly 302 is temporarily stopped at a given bar-code reading position.

The lights from the two light bulbs 906 and 908 thus pass through the narrower and wider slots 614 and 616 of the bar-code label. The photo sensor 904 is adapted to sense the light from the light source 902 passing through the slots 614 and 616 to read the bar-code pattern established on the bar-code label. The photo sensor 904 produces a digital code signal based on the read bar-code pattern which it outputs to to a controller 324 adapted to control selection of the body assembly line components and to control assembly operations. The controller 324 may also be adapted to control operation of a robot installed at the extra welding station 308 for performing additional welding according to instructions and information encoded in the bar-code label.

The same bar-code reading processes are performed at the floor assembly line 200, the body production number applying station 800, the color mark station 700 and metal line 400.

The bar-code label 602 attached to the wheel house 104 in the engine compartment assembly is carried with the assembled vehicle body into the painting shop or painting line 500. In the painting line, well-known processes are performed regardless of the presence of the bar-code label 602. After primer coating in the primer coat station 504 and the intermediate coating in the intermediate coat station 506, the bar code is still legible by the bar-code reader 900. As shown in FIG. 6, the light source 902 and the photo sensor 904 are installed in the final coat station 518. In this final coat station, the painting robot 530 associated with the robot operator 528 is also provided. The painting robot 530 is adapted to apply a color indication mark 532 which identifies the body color of the vehicle body. The robot operator 528 is connected to a controller 526 which receives the digital code signal indicative of the instructions and information relating to model, type and specifications of the vehicle body, including identification of the body color, from the photo sensor 904. The controller outputs a control signal indicative of the body color to be painted on the vehicle body to robot 530, which than applies the color indication mark to the vehicle body.

The section for reading the bar code and applying the color indication mark may alternatively be located at the initial part of the final coat station.

As described hereabove, the control system according to the present invention is effectively applicable to processes including painting and can peform control even during the painting process. In the preferred embodiment, a metal sheet is used as the substrate of the bar-code label 602 so that it will not be damaged by the heat or obscured by paint in the painting process.

Although a specific embodiment applied to the vehicle body assembly process has been described in detail, the bar-code label control may also be applied to a finishing process for installing head lamps, vehicle seats, dash boards and so forth, following the foregoing body assembling and painting process. Further, though the present invention has been described in connection with the automotive industry, the same system can be applied to various manufacturing processes.

What is claimed is:

1. A control system for an industrial manufacturing process for manufacturing products to be assembled from a plurality of components, comprising:

first means for obtaining information and instructions related to each of the products to be manufactured according to a predetermined production plan and for generating electrical signals representative of the obtained information and instructions at predetermined time intervals;

second means, responsive to said electrical signals from said first means, for converting each of the electrical signals into a bar-code pattern and encoding the bar-code pattern in a blank label, said bar-code pattern comprising a combination of first slots having a first width and second slots having a second width different from said first width, and said first and second slots being arranged to represent the contents of said electrical signal;

third means for attaching said encoded label to a base component to which other components are to be assembled; and fourth means for reading said bar-code and for obtaining information which identifies components to be assembled to said base component and for obtaining instructions for controlling manufacturing process operations, said fourth means producing a control signal based on said label, said control signal being indicative of said identified components and required manufacturing process operations.

2. The system as set forth in claim 1, wherein said fourth means includes a bar-code reader means for reading the bar-code in the label via a laser beam and for producing a digital signal indicative of said bar code.

3. The system as set forth in claim 1, wherein said fourth means includes a bar-code reader means for photoelectrically reading the bar-code in the label and for producing a digital signal indicative of said information and instructions relating to each of the products to be manufactured.

4. The system as set forth in claim 3, wherein said control signal comprises a binary code and wherein one of said first and second slots represents a binary "0" and the other of said first and second slots represents a binary "1".

5. The system as set forth in claim 4, further comprising a means for painting the products assembled from a plurality of components, and wherein said fourth means controls said painting means based on the information and instructions encoded in said label.

6. The system as set forth in claim 5, further comprising a means for assembling the products in a series of assembly lines, and wherein said painting means comprises a plurality of painting stations each of which is controlled by said fourth means.

7. The system as set forth in claim 6, wherein each of said series of assembly lines and each of said painting stations, is responsive to said fourth means in order to derive information and instructions from said label.

8. The system as set forth in claim 3, wherein said label comprises an essentially rigid sheet adapted to be attached to a selected one of said components, and wherein said first and second slots identify required manufacturing operations associated with said components.

9. The system as set forth in claim 8, wherein said first and second slots are substantially rectangular slots of different widths and wherein said first slot represents a binary "0" and said second slot represents a binary "1".

10. The system as set forth in claim 9, wherein said second slot is approximately 2.8–3.0 times wider than said first slot.

11. The system as set forth in claim 9, wherein said slots are adapted to be read by an optical sensor means for producing a digital signal corresponding to an arrangement of the first and second slots.

12. The system as set forth in claim 9, wherein said slots are adapted to be read by means of a laser sensor means for producing a digital signal corresponding to an arrangement of the first and second slots.

13. The system as set forth in claim 1, wherein said second means comprise a bar-code encoding means for preparing said bar-coded label which comprises:

a first punch means for forming said first slots in said blank label, said first punch means being installed at a first station at which said first slots are formed;

a second punch means, provided at a second station at which said second slots are formed, for forming said second slots;

a holder means for holding said label, said holder means being movable between said first and second stations;

a first actuator means associated with said holder means for driving said holder means to hold said label;

a second actuator means associated with said holder means for driving said holder means to move between said first and second stations; and a controller means, associated with said first and second punch means and said first and second actuator means, for controlling operations thereof, said controller means receiving said electrical signals and converting said electrical signals into the bar-code pattern to be encoded in the blank label, and said controller means outputting control signals to said first and second punch means and to said first and second actuator means for controlling the operations thereof according to the bar-code pattern.

14. The system as set forth in claim 13, wherein said controller means comprises:

means for operating said first actuator means to actuate the holder means to hold said blank label through a subsequent label encoding operation;

means for operating said second actuator means to move said holder means to said first station and stop the holder means whenever one of a first group of specific points of the label opposes said first punch means, which first specific points are identified according to the bar-code pattern;

means for operating said first punch means to form one of said first slots whenever said holder means stop in a position wherein one of said first specific points of the blank label is opposite the first punch means;

means for operating said second actuator means to move said holder means from said first station to said second station and for stopping said holder means whenever one of a second group of specific points of the label opposes said second punch means, said second specific points of the blank label being according to the determined bar-code pattern; and means for operating said second punch means to form one of said second slots whenever said holder means stops in a position wherein one of the second specific points of the label is opposite said second punch means.

15. The system as set forth in claim 14, wherein said controller means further comprises:

means for operating said second actuator means to move said holder means such that all of said first slots are formed before any of said second slots are formed; and means for operating said second acutator means to sequentially form said second slots after formation of said first slots.

16. The system as set forth in claim 15, wherein said first and second stations are aligned with each other, and said second actuator means moves said holder means substantially linearly through said aligned first and second stations.

17. The system as set forth in claim 16, wherein said first and second punch means further comprise a common third actuator means, associated with said controller means, for operating said first and second punch means when either of said first and second punch means are used to form one of said first and second slots.

18. The system as set forth in claim 17, further comprising a common ram, wherein said first and second punch means are mounted on said common ram which is driven toward and away from said blank label by said third actuator means.

19. The system as set forth in claim 18, which further comprises a fourth actuator means for shifting said holder means perpendicularly to an axis of alignment of said first and second stations, said fourth actuator means being associated with said controller means to be controlled to shift the label between a first shift position in which a first set of first and second slots are aligned and a second shift position in which a second set of first and second slots are aligned.

20. The system as set forth in claim 19, wherein said controller means operates said fourth actuator means to shift the label from said first shift position to said second shift position after all of the first and second slots of said first set have been formed.

21. The system as set forth in claim 20, wherein said controller means further comprises:

means for operating said second actuator means to move said holder means to said second station and for stopping said holder whenever one of a third group of specific points of the blank label opposes said second punch means;

means for activating said third actuator means to operate said first and second punch means to form one of said second slots with said second punch means, whenever said holder means is stopped opposite said second station;

means for operating said second actuator means to move said holder means from said second station to said first station and to stop the holder means whenever one of a fourth group of specific points opposes said first punch means; and means for actuating said third actuator means to form one of said first slots with said first punch means whenever said holder means is stopped opposite said first punch means.

22. The system as set forth in claim 21, wherein said controller means further comprises means for deactivating said first actuator means after the first and second slots are formed.

23. The system as set forth in claim 22, which further comprises a bar-code reader means for reading the encoded label and outputting a signal indicative of binary data represented by the bar code on said label to said controller means, and wherein said controller means further comprises means for comparing a signal value of said bar-code reader signal with initially stored binary data for confirmation.

24. The system as set forth in claim 14, wherein said controller means further comprises means for deactivating said first actuator means after all of said first and second slots are formed.

25. The system as set forth in claim 24, which further comprises a bar-code reader means for reading the encoded label and outputting a signal indicative of binary data represented by the bar code on said label to said controller means, and wherein said controller means further comprises means for comparing a signal value of said bar-code reader signal with initially stored binary data for confirmation.

26. The system as set forth in claim 13, further comprising a series of assembly line means for assembling various models, types and specifications of products from a plurality of components, each of which has a variety of types and specifications suitable for use in at least one of the products to be assembled, said series comprising:

a first assembly line means for assembly a base component to which a plurality of other components are to be attached to form said product;

a second assembly line means for attaching said other components to said base component to complete said assembly, said second assembly line means comprising a storage area for storing said other components sorted according to type and specification;

a plurality of sub-assembly line means for fabricating each of said other components, each of said sub-assembly lines comprising a third station for applying a color mark to a component in order to indicate type and specification of the component, and a means for feeding said other components with said color marks to said storage area in said second assembly line means;

a fourth station means, located between said first and second assembly line means, for applying first color marks, matching second color marks of the other components of type and specification suitable for the product, to said base components at first points near points of attachment of said other components for identifying said other components to be attached thereto according to model, type and specifications of the products to be assembled; and means, provided in said second assembly line means, for selecting said other components to be attached as a function of said second color marks matching said first color marks appearing on said base component.

27. The system as set forth in claim 1, further comprising a series of assembly line means for assembling various models, types and specifications of products from a plurality of components, each of which has a variety of types and specifications suitable for use in at least one of the products to be assembled, said series comprising:
- a first assembly line means for assembling a base component to which a plurality of other components are to be attached to form said product;
- a second assembly line means for attaching said other components to said base component to complete said product, said second assembly line means comprising a storage area for storing said other components sorted according to type and specification;
- a plurality of sub-assembly line means for fabricating each of said other components, each of said sub-assembly lines comprising a third station for applying a color mark to a component in order to indicate type and specification of the component, and a means for feeding said other components with said color marks to said storage area in said second assembly line;
- a fourth station means, located between said first and second assembly line means, for applying first color marks matching second color marks of the other components of type and specification suitable for the product to said base components at first points near points of attachment of said other components for identifying said other components to be attached thereto according to model, type and specifications of the products to be assembled; and
- means, provided in said second assembly line means, for selecting said other components to be attached as a function of said second color marks matching said first color marks appearing on said base component.

28. The system as set forth in claim 27, which further comprises a fifth station means for applying information relating to the model, type and specifications of the product to be assembled and identifying types and specifications of said other components to be attached to said base component onto said base component in the form of a said bar code.

29. The system as set forth in claim 28, wherein said fourth station comprises:
- a bar-code reader means for obtaining information from said bar code on said base component and for outputting a digital signal representative of the obtained information including identification of said other components to be attached to said base component;
- a controller means for receiving said digital signal from said bar-code reader means and for outputting control signals according to the obtained information;
- a plurality of painting means, arranged adjacent a transporter system conveying said base components from said first assembly line means to said second assembly line means, for painting said first color marks onto predetermined portions of said base component said painting means being responsive to said control signals from said controller to apply said first color marks to said base component.

30. The system as set forth in claim 29, wherein said color mark are comprised of water-soluble paint.

31. The system as set forth in claim 29, wherein said base component is a vehicle body and wherein said components are doors, fenders and other vehicle body-related subassemblies.

32. An automotive vehicle assembling system for assembling various models and types of vehicle components to be assembled through a single common line and for painting the assembled components comprising
- a control system means for controlling assembling and painting operations comprising:
- first means for obtaining information and instructions relating to a specific model, type and/or specifications of each vehicle to be assembled and converting the obtained information and instructions into a digital code representative thereof;
- second means, responsive to said digital code, for encoding a blank bar code in a label, said bar code comprising a combination of identical first slots and identical second slots, said second slots differing in size from said first slots, and said first and second slots being arranged in said label to indicate said digital code;
- third means for attaching said encoded label to a base component of the vehicle;
- fourth means for reading said encoded label and producing a first control signal for identifying vehicle components to be assembled and for controlling the assembling operations, and
- fifth means for reading said encoded label and producing a second control signal for controlling painting operations.

33. The system as set forth in claim 32, wherein said bar-code label is comprised of an essentially rigid sheet adapted to be attached to a selected one of said components, the first and second slots of said label being slots extending through said sheet said first slots being narrow slots and said second slots being wide slots, said first and second slots being arranged so as to indicate specific binary data representative of said components and required manufacturing operations.

34. The system as set forth in claim 33, wherein, said first slots representing a binary "0" and said second slots representing a binary "1".

35. The system as set forth in claim 34, wherein said second slots are approximately 2.8–3.0 times wider than said first slots.

36. The system as set forth in claim 35, wherein said slots are adapted to be read by means of an optical sensor means for producing a digital signal corresponding to a combination of the first and second slots.

37. The system as set forth in claim 35, wherein said slots are adapted to be read by means of a laser sensor means for producing a digital signal corresponding to a combination of the first and second slots.

38. The system as set forth in claim 33, wherein said second means includes a bar-code encoding means for preparing a bar-code label with a combination of said first and second slots, said bar-code encoding means comprising:
- a first punch means for forming said first slots in said blank label, said first punch means being installed at a first station at which said first slots are formed;
- a second punch means, provided at a second station at which said second slots are formed, for forming said second slots;
- a holder means for holding said label, said holder means being movable between said first and second stations;
- a first actuator means associated with said holder means for driving said holder means to hold said label;
- a second actuator means associated with said holder means for moving said holder means between said first and second stations; and a controller means associated with said first and second punch means and said first and second actuator means for controlling operations thereof, said controller means receiving a signal indicative of said specific binary data and converting the specific binary data into a bar-code pattern to be encoded in the blank label and outputting control signals to said first and second punch means and said first and second actuator means, said control signals controlling the operations thereof according to the bar-code pattern.

39. The system as set forth in claim 38, wherein said controller means further comprises:

means for operating said first actuator means to drive the holder means to hold said blank label;

means for operating said second actuator means to move said holder means to said first station and stop the holder means whenever one of a first group of specific points of the label opposes said first punch means which specific points are identified according to the bar-code pattern;

means for operating said first punch means to form one of said first slots whenever said holder means stops opposite the first punch means;

means for operating said second actuator means to move said holder means from said first station to said second station and for stopping the holder means whenever one of a second group of specific points of the label opposes said second punch means; and means for operating said second punch means to form one of said second slots whenever said holder means stops opposite said second punch means.

40. The system as set forth in claim 39, wherein said controller means further comprises:

means for operating said second actuator means to move said holder means so as to form all the first slots before forming any of said second slots; and means for operating said second actuator means to form said second slots after formation of said first slots.

41. The system as set forth in claim 40, which further comprises a fourth actuator means for shifting said holder means in a direction perpendicular to movement of said second actuator means, said fourth actuator being associated with said controller means to be controlled to shift the label between a first shift position in which a first set of first and second slots are aligned and a second shift position in which a second set of first and second slots are aligned.

42. The system as set forth in claim 41, wherein said controller means further comprises:

means for operating said second actuator means to move said holder to said second station and stop said holder means whenever one of a third group of specific points of the label opposes said second punch means;

means for operating said second punch means to form one of said second slots whenever said holder means stops opposite said second station;

means for operating said second actuator means to move said holder means from said second station to said first station and stop said holder means whenever one of a fourth group of specific points of said label opposes said first punch means; and means for operating said first punch means to form one of said first slots whenever said holder means stops opposite said first punch means.

43. The system as set forth in claim 42, further comprising a series of assembly line means for assembling various models, types and specifications of products from a plurality of components, each of which has a variety of types and specifications suitable for use in at least one of the products to be assembled, said series comprising:

a first assembly line means for assembling a base component to which a plurality of other components are to be attached to form said product;

a second assembly line means for attaching said other components onto said base component to complete said product, said second assembly line means comprising a storage area for storing said other components sorted according to type and specification;

a plurality of sub-assembly line means for fabricating each of said other components, each of said sub-assembly lines comprising a third station for applying a color mark to a component in order to indicate type and specification of the component, and a means for supplying said other components with said color marks to said storage area in said second assembly line means;

a fourth station means located between said first and second assembly line means for applying first color marks, matching second color marks of the other components of type and specification suitable for the product, to said base components at points near the points of attachment of said other components for identifying said other components to be attached thereto according to model, type and specifications of the product to be assembled; and means, provided in said second assembly line means, for selecting said other components to be attached as a function of said second color marks matching said first color marks appearing on said base component.

44. The system as set forth in claim 43, which further comprises a fifth station means for applying information relating to the model, type, and specifications of the product to be assembled and identifying types and specifications of said other components to be attached to said base component onto said base component in the form of said bar code.

45. The system as set forth in claim 44, wherein said fourth station comprises:

a bar-code reader means for obtaining information from said bar code on said base component and for outputting a digital signal representative of the obtained information including identification of said other components to be attached to said base component;

a controller means for receiving said digital signal from said bar-code reader means and for outputting control signals according to the obtained information;

a plurality of painting means, arranged adjacent a transporter sytsem conveying said base components from said first assembly line means to said second assembly line means for painting said first color marks onto predetermined portions of said base component said painting means being responsive to said control signals from said controller to apply said first color marks to said base component.

* * * * *